(12) United States Patent
You et al.

(10) Patent No.: US 12,055,686 B2
(45) Date of Patent: Aug. 6, 2024

(54) OPTICAL IMAGING SYSTEM

(71) Applicant: ZHEJIANG SUNNY OPTICS CO., LTD., Zhejiang (CN)

(72) Inventors: Xinghai You, Zhejiang (CN); Kaiyuan Zhang, Zhejiang (CN); Lin Huang, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 843 days.

(21) Appl. No.: 17/257,304

(22) PCT Filed: Apr. 4, 2019

(86) PCT No.: PCT/CN2019/081361
§ 371 (c)(1),
(2) Date: Dec. 31, 2020

(87) PCT Pub. No.: WO2020/010878
PCT Pub. Date: Jan. 16, 2020

(65) Prior Publication Data
US 2021/0231925 A1    Jul. 29, 2021

(30) Foreign Application Priority Data

Jul. 9, 2018    (CN) .......................... 201810746192.9

(51) Int. Cl.
*G02B 13/00* (2006.01)
*G02B 9/64* (2006.01)
*G02B 27/00* (2006.01)

(52) U.S. Cl.
CPC .......... *G02B 13/0045* (2013.01); *G02B 9/64* (2013.01); *G02B 27/0025* (2013.01)

(58) Field of Classification Search
CPC ... G02B 13/0045; G02B 9/64; G02B 27/0025
(Continued)

(56) References Cited

U.S. PATENT DOCUMENTS

| 8,599,495 B1 * | 12/2013 | Tsai ......................... G02B 9/64 |
| | | 359/755 |
| 2016/0033742 A1 * | 2/2016 | Huang ..................... G02B 9/64 |
| | | 359/708 |

(Continued)

FOREIGN PATENT DOCUMENTS

| CN | 204188870 U | 3/2015 |
| CN | 108051902 A | 5/2018 |

(Continued)

*Primary Examiner* — Stephone B Allen
*Assistant Examiner* — Leonidas Boutsikaris
(74) *Attorney, Agent, or Firm* — Samson G. Yu

(57) ABSTRACT

The disclosure discloses an optical imaging system, sequentially includes from an object side to an image side along an optical axis: a first lens, a second lens, a third lens, a fourth lens, a fifth lens, a sixth lens and a seventh lens, wherein the first lens has a positive refractive power; the second lens has a negative refractive power, an object-side surface thereof is a concave surface, and an image-side surface thereof is a convex surface; the third lens has a refractive power; the fourth lens has a positive refractive power, an object-side surface thereof is a concave surface, and an image-side surface thereof is a convex surface; the seventh lens has a negative refractive power, an object-side surface thereof is a convex surface; and a total effective focal length f of the optical imaging system and an entrance pupil diameter EPD of the optical imaging system satisfy f/EPD≤0.8.

18 Claims, 25 Drawing Sheets

(58) Field of Classification Search
USPC .......................................................... 359/755
See application file for complete search history.

(56) References Cited

U.S. PATENT DOCUMENTS

| | | | |
|---|---|---|---|
| 2017/0227734 A1* | 8/2017 | Huang | G02B 9/64 |
| 2018/0149835 A1* | 5/2018 | Park | G02B 13/0045 |
| 2019/0258028 A1* | 8/2019 | Huang | G02B 27/0037 |
| 2021/0173183 A1* | 6/2021 | Ye | G02B 9/64 |
| 2022/0413264 A1* | 12/2022 | Kim | G02B 9/64 |
| 2023/0305269 A1* | 9/2023 | Huang | H04N 23/55 |
| | | | 359/755 |

FOREIGN PATENT DOCUMENTS

| | | |
|---|---|---|
| CN | 108121052 A | 6/2018 |
| CN | 108873255 A | 11/2018 |
| CN | 208521053 U | 2/2019 |
| JP | 10206729 A | 8/1998 |

* cited by examiner lateral color curve lateral color curve lateral color curve longitudinal aberration curve astigmatism curve lateral color curve

OPTICAL IMAGING SYSTEM

CROSS-REFERENCE TO RELATED APPLICATION(S)

The disclosure claims priority to and the benefit of Chinese Patent Application No. 201810746192.9, filed in the China National Intellectual Property Administration (CNIPA) on 9 Jul. 2018, which is incorporated herein by reference in its entirety.

TECHNICAL FIELD

The disclosure relates to an optical imaging system, and more particularly, the disclosure relates to an optical imaging system including seven lenses.

BACKGROUND

With the development of science and technology, portable electronic products have gradually emerged, and portable electronic products with photographing functions are more and more popular among people, therefore, there is a gradually increasing requirement for camera lenses suitable for portable electronic products in the market. On the one hand, as portable electronic products such as smart phones tend to be miniaturized, the total length of lenses is limited, thereby increasing the difficulty in designing the lenses. On the other hand, with the improvement of performance and the reduction of size of common photosensitive elements such as a charge coupled device (CCD) or a complementary metal oxide semiconductor (CMOS) element, the number of picture elements of the photosensitive element is increased and the size of picture elements thereof is reduced, and thus there is a higher requirement for high imaging quality and miniaturization of camera lenses matched.

In order to satisfy the requirement of miniaturization, the number of apertures (F-number) generally configured in the existing lens is 2.0 or more, so as to achieve both miniaturization and good optical performance. However, with the continuous development of portable electronic products such as smart phones, there are higher requirements for camera lenses matched, and particularly in cases of insufficient light (such as rainy day and dusk), hands tremble, etc., a lens with a F-number of 2.0 or more cannot satisfy higher-order imaging requirements.

SUMMARY

Some embodiments of the disclosure provide an optical imaging system, such as a large-aperture imaging lens, which can be applicable to a portable electronic product and can at least solve or partially solve at least one of the aforementioned drawbacks in the prior art.

One implementation mode of the disclosure provides an optical imaging system, the imaging system includes sequentially from an object side to an image side along an optical axis: a first lens, a second lens, a third lens, a fourth lens, a fifth lens, a sixth lens, and a seventh lens, wherein the first lens may have a positive refractive power; the second lens may have a negative refractive power, an object-side surface thereof may be a concave surface, and an image-side surface thereof may be a convex surface; the third lens has a refractive power; the fourth lens may have a positive refractive power, an object-side surface thereof may be a concave surface, and an image-side surface thereof may be a convex surface; the fifth lens has a refractive power; the sixth lens has a refractive power; and the seventh lens may have a negative refractive power, and an object-side surface thereof may be a convex surface, and wherein a total effective focal length f of the optical imaging system and an entrance pupil diameter EPD of the optical imaging system may satisfy f/EPD≤0.8.

In an implementation mode, the total effective focal length f of the optical imaging system and an effective focal length f1 of the first lens may satisfy 1≤f/f1<1.5.

In an implementation mode, the total effective focal length f of the optical imaging system and an effective focal length f7 of the seventh lens may satisfy −1<f/f7<0.

In an implementation mode, a curvature radius R2 of an image-side surface of the first lens and a curvature radius R1 of an object-side surface of the first lens may satisfy 1<R2/(R1*2)≤2.5.

In an implementation mode, a curvature radius R13 of an object-side surface of the seventh lens, a curvature radius R14 of an image-side surface of the seventh lens, a curvature radius R11 of an object-side surface of the sixth lens, and a curvature radius R12 of an image-side surface of the sixth lens may satisfy 0.3<(R13+R14)/(R11+R12)<1.

In an implementation mode, a center thickness CT1 of the first lens on the optical axis, a center thickness CT2 of the second lens on the optical axis, a center thickness CT3 of the third lens on the optical axis, and a center thickness CT4 of the fourth lens on the optical axis may satisfy 0.7≤CT1/(CT2+CT3+CT4)<1.1.

In an implementation mode, a spacing distance T23 of the second lens and the third lens on the optical axis and a center thickness CT3 of the third lens on the optical axis may satisfy 0.1≤T23/CT3<0.8.

In an implementation mode, a combined focal length f34 of the third lens and the fourth lens and a combined focal length f56 of the fifth lens and the sixth lens may satisfy −5<f34/f56<1.

In an implementation mode, ΣCT is a sum of the center thicknesses of the first lens to the seventh lens on the optical axis, TTL is a distance from an object-side surface of the first lens to an imaging surface of the optical imaging system on the optical axis, ΣCT and TTL may satisfy 0.5≤ΣCT/TTL≤0.7.

In an implementation mode, the total effective focal length f of the optical imaging system and a maximum angle of half field of view HFOV of the optical imaging system may satisfy 3.9 mm≤f*TAN(HFOV)<4.5 mm.

Another implementation mode of the disclosure provides an optical imaging system, the imaging system includes sequentially from an object side to an image side along an optical axis: a first lens, a second lens, a third lens, a fourth lens, a fifth lens, a sixth lens, and a seventh lens; wherein the first lens may have a positive refractive power; the second lens may have a negative refractive power, an object-side surface thereof may be a concave surface, and an image-side surface thereof may be a convex surface; the third lens has a refractive power; the fourth lens may have a positive refractive power, an object-side surface thereof may be a concave surface, and an image-side surface thereof may be a convex surface; the fifth lens has a refractive power; the sixth lens has a refractive power; and the seventh lens may have a negative refractive power, and an object-side surface thereof may be a convex surface; and wherein a total effective focal length f of the optical imaging system and an effective focal length f7 of the seventh lens may satisfy −1<f/f7<0.

A further implementation mode of the disclosure provides an optical imaging system, the imaging system includes sequentially from an object side to an image side along an optical axis: a first lens, a second lens, a third lens, a fourth lens, a fifth lens, a sixth lens, and a seventh lens; wherein the first lens may have a positive refractive power; the second lens may have a negative refractive power, an object-side surface thereof may be a concave surface, and an image-side surface thereof may be a convex surface; the third lens has a refractive power; the fourth lens may have a positive refractive power, an object-side surface thereof may be a concave surface, and an image-side surface thereof may be a convex surface; the fifth lens has a refractive power; the sixth lens has a refractive power; and the seventh lens may have a negative refractive power, and an object-side surface thereof may be a convex surface; and wherein a curvature radius R2 of an image-side surface of the first lens and a curvature radius R1 of an object-side surface of first lens may satisfy 1<R2/(R1*2)≤2.5.

A further implementation mode of the disclosure provides an optical imaging system, the imaging system includes sequentially from an object side to an image side along an optical axis: a first lens, a second lens, a third lens, a fourth lens, a fifth lens, a sixth lens, and a seventh lens; wherein the first lens may have a positive refractive power; the second lens may have a negative refractive power, an object-side surface thereof may be a concave surface, and an image-side surface thereof may be a convex surface; the third lens has a refractive power; the fourth lens may have a positive refractive power, an object-side surface thereof may be a concave surface, and an image-side surface thereof may be a convex surface; the fifth lens has a refractive power; the sixth lens has a refractive power; and the seventh lens may have a negative refractive power, and an object-side surface thereof may be a convex surface; and wherein a curvature radius R13 of an object-side surface of the seventh lens, a curvature radius R14 of an image-side surface of the seventh lens, a curvature radius R11 of an object-side surface of the sixth lens, and a curvature radius R12 of an image-side surface of the sixth lens may satisfy 0.3<(R13+R14)/(R11+R12)<1.

A further implementation mode of the disclosure provides an optical imaging system, the imaging system includes sequentially from an object-side to an image side along an optical axis: a first lens, a second lens, a third lens, a fourth lens, a fifth lens, a sixth lens, and a seventh lens; wherein the first lens may have a positive refractive power; the second lens may have a negative refractive power, an object-side surface thereof may be a concave surface, and an image side surface thereof may be a convex surface; the third lens has a refractive power; the fourth lens may have a positive refractive power, an object-side surface thereof may be a concave surface, and an image-side surface thereof may be a convex surface; the fifth lens has a refractive power; the sixth lens has a refractive power; and the seventh lens may have a negative refractive power, and an object-side surface thereof may be a convex surface; and wherein a center thickness CT1 of the first lens on the optical axis, a center thickness CT2 of the second lens on the optical axis, a center thickness CT3 of the third lens on the optical axis, and a center thickness CT4 of the fourth lens on the optical axis may satisfy 0.7≤CT1/(CT2+CT3+CT4)<1.1.

The disclosure uses multiple (for embodiment, seven) lenses, and reasonably distributes the refractive power and surface shape of each lens, the center thickness of each lens, the axial spacing between lenses, etc., such that the described optical imaging system has at least one of beneficial effects such as ultra-thinness, miniaturization, large aperture and high imaging quality.

BRIEF DESCRIPTION OF THE DRAWINGS

In conjunction with the accompanying drawings, other features, objects, and advantages of the disclosure will become more apparent from the following detailed description of non-limiting embodiments. In the accompanying drawings.

DETAILED DESCRIPTION OF THE EMBODIMENTS

Figure 1:
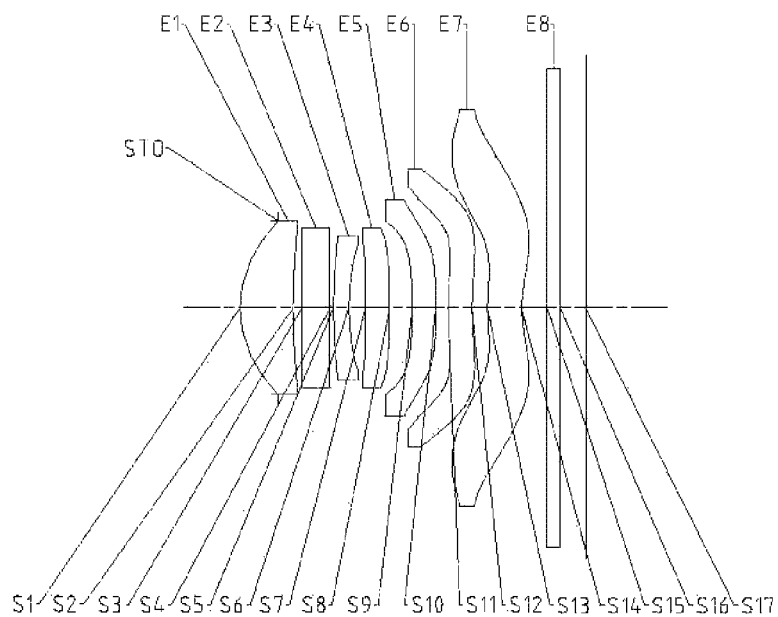
FIG. 1 shows a schematic structural view of an optical imaging system according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

An optical imaging system according to an exemplary embodiment of the disclosure may include seven lenses having refractive power, that is, a first lens, a second lens, a third lens, a fourth lens, a fifth lens, a sixth lens and a seventh lens. The seven lenses are sequentially arranged from an object side to an image side along an optical axis. In the first lens to the seventh lens, any two adjacent lenses may be an air space between them.

In an exemplary embodiment, the first lens may have a positive refractive power; the second lens may have a negative refractive power, an object-side surface thereof may be a concave surface, and an image-side surface thereof may be a convex surface; the third lens has a positive refractive power or a negative refractive power; the fourth lens may have a positive refractive power, an object-side surface thereof may be a concave surface, and an image-side surface thereof may be a convex surface; the fifth lens has a positive refractive power or a negative refractive power; the sixth lens has a positive refractive power or a negative refractive power; and the seventh lens may have a negative refractive power, and an object-side surface thereof may be a convex surface.

In an exemplary embodiment, an object-side surface of the first lens may be a convex surface, and an image-side surface thereof may be a concave surface.

In an exemplary embodiment, an object-side surface of the sixth lens may be a convex surface, and an image-side surface thereof may be a concave surface.

In an exemplary embodiment, an image-side surface of the seventh lens may be a concave surface.

In an exemplary embodiment, the optical imaging system of the disclosure may satisfy the condition expression f/EPD≤0.8, wherein f is a total effective focal length of the optical imaging system, and EPD is an entrance pupil diameter of the optical imaging system. More specifically, f and EPD may further satisfy 1.60≤f/EPD≤1.77. By reasonably controlling the ratio of the total effective focal length to the entrance pupil diameter of the optical imaging system, it is beneficial to increase the amount of light passing through the lenses per unit time, so that the optical imaging system has advantages of high pixel and large aperture, thereby improving the imaging effect in a dark environment while reducing the aberration of an edge field of view, and effectively controlling the amount of distortion of the system.

In an exemplary embodiment, the optical imaging system of the disclosure may satisfy the condition expression 3.9 mm≤f*TAN(HFOV)<4.5 mm, wherein f is a total effective focal length of the optical imaging system, and HFOV is a maximum angle of half field of view of the optical imaging system. More specifically, f and HFOV may further satisfy 3.90 mm≤f*TAN(HFOV)<4.10 mm, e.g., 3.90 mm≤f*TAN(HFOV)≤3.95 mm. By controlling the total effective focal length of the optical imaging system and the maximum angle of half field of view of the optical imaging system, the image height of the optical system is controlled within a certain reasonable range, so as to ensure that said system can match a large-image-surface chip, such that the system has the characteristics of high pixels, low sensitivity, easy processing, etc.

In an exemplary embodiment, the optical imaging system of the disclosure may satisfy the condition expression $1f/f1<1.5$, wherein f is a total effective focal length of the optical imaging system, and f1 is an effective focal length of the first lens. More specifically, f and f1 may further satisfy $1.02 \leq f/f1 \leq 1.22$. By controlling the positive refractive power of the first lens to be within a reasonable range, the first lens can not only bear the positive refractive power required by the system, but also can control the spherical aberration contributed by the first lens to be within a certain range, thereby ensuring that subsequent optical lenses can reasonably correct the negative spherical aberration contributed by the first lens, so that the system has a better image quality in an axial field of view region.

In an exemplary embodiment, the optical imaging system of the disclosure may satisfy the condition expression $-1<f/f7<0$, wherein f is a total effective focal length of the optical imaging system, and f7 is an effective focal length of the seventh lens. More specifically, f and f7 may further satisfy $-0.76 \leq f/f7 \leq -0.25$. By confining the refractive power of the seventh lens to a reasonable range, a third-order positive spherical aberration and a fifth-order negative spherical aberration which are contributed by the seventh lens are within reasonable ranges, so as to balance residual spherical aberration generated by the front lenses, such that the system has a better image quality in an axial field of view region.

In an exemplary embodiment, the optical imaging system of the disclosure may satisfy the condition expression $1<R2/(R1*2) \leq 2.5$, wherein R2 is a curvature radius of an image-side surface of the first lens, and R1 is a curvature radius of an object-side surface of the first lens. More specifically, R2 and R1 may further satisfy $1.49 \leq R2/(R1*2) \leq 2.48$. By controlling the radii of curvature of the object-side surface and the image-side surface of the first lens, a total deflection angle of the light rays at the edge field of view of the object-side surface and the image-side surface of the first lens can be controlled within a reasonable range, thereby effectively reducing the sensitivity of the system.

In an exemplary embodiment, the optical imaging system of the disclosure may satisfy the condition expression $0.3<(R13+R14)/(R11+R12)<1$, wherein R13 is a curvature radius of an object-side surface of the seventh lens, R14 is a curvature radius of an image-side surface of the seventh lens, R11 is a curvature radius of an object-side surface of the sixth lens, and R12 is a curvature radius of an image-side surface of the sixth lens. More specifically, R13, R14, R11 and R12 may further satisfy $0.38 \leq (R13+R14)/(R11+R12) \leq 0.73$. By controlling the radii of curvature of the object-side surfaces and the image-side surfaces of the sixth lens and the seventh lens, an incident angles of chief rays on each field of view on an image surface can be reasonably controlled, thereby being beneficial to satisfy the requirement on the incident angle of a chief ray in the design of an optical system.

In an exemplary embodiment, the optical imaging system of the disclosure may satisfy the condition expression $0.7 \leq CT1/(CT2+CT3+CT4)<1.1$, wherein CT1 is a center thickness of the first lens on the optical axis, CT2 is a center thickness of the second lens on the optical axis, CT3 is a center thickness of the third lens on the optical axis, and CT4 is a center thickness of the fourth lens on the optical axis. More specifically, CT1, CT2, CT3 and CT4 may further satisfy $0.73 \leq CT1/(CT2+CT3+CT4) \leq 1.03$. Satisfying the condition expression $0.7 \leq CT1/(CT2+CT3+CT4)<1.1$ enables the center thicknesses of the first lens, the second lens, the third lens and the fourth lens to be within certain reasonable ranges, both facilitating ensuring the processing characteristics of the lens and facilitating enabling the lens to satisfy the ultrathin characteristic.

In an exemplary embodiment, the optical imaging system of the disclosure may satisfy the condition expression $0.1 \leq T23/CT3<0.8$, wherein T23 is a spacing distance between the second lens and the third lens on the optical axis, and CT3 is a center thickness of the third lens on the optical axis. More specifically, T23 and CT3 may further satisfy $0.11 \leq T23/CT30 \leq 0.59$. By reasonably limiting the ratio of the spacing distance between the second lens and the third lens to the center thickness of the third lens, the field curvature and distortion amount of the system can be effectively ensured, so that the off-axis field of view thereof has a good imaging quality.

In an exemplary embodiment, the optical imaging system of the disclosure may satisfy the condition expression $-5<f34/f56<1$, wherein f34 is a combined focal length of the third lens and the fourth lens, and f56 is a combined focal length of the fifth lens and the sixth lens. More specifically, f34 and f56 may further satisfy $-4.82 \leq f34/f56 \leq 0.91$. By reasonably controlling the combined focal length of the third lens and the fourth lens and the combined focal length of the fifth lens and the sixth lens, the contribution amounts of aberration of the four lenses can be reasonably controlled, so that the aberration contribution amounts of the four lenses can be balanced with aberration generated by optical lenses at a front end, and the system aberration is in a reasonable horizontal state, thereby enabling the optical imaging system to have a good imaging quality.

In an exemplary embodiment, the optical imaging system of the disclosure may satisfy the condition expression $0.5 \leq \Sigma CT/TTL \leq 0.7$, wherein $\Sigma CT$ is a sum of center thicknesses of the first lens to the seventh lenses on the optical axis, and TTL is a distance from an object-side surface of the first lens to an imaging surface of the optical imaging system on the optical axis. More specifically, $\Sigma CT$ and TTL may further satisfy $0.54 \Sigma CT/TTL \leq 0.62$. By reasonably controlling the sum of the center thicknesses of the first lens, the second lens, the third lens, the fourth lens, the fifth lens, the sixth lens and the seventh lens, the range of residual distortion after balancing of the seven lenses can be reasonably controlled, so that the system has a good distortion performance.

In an exemplary embodiment, the optical imaging system may further include a diaphragm to improve the imaging quality of the imaging system. The diaphragm may be provided at any position between an object side and an image side as needed, and for example, the diaphragm may be provided between the object side and the first lens. Optionally, the optical imaging system above may further include an optical filter for correcting chromatic aberration and/or a protective glass for protecting a photosensitive element located on the imaging surface.

The optical imaging system according to the embodiments above of the disclosure may use multiple lenses, for example, seven lenses as described above. By reasonably distributing the refractive power and surface type of each lens, the center thickness of each lens, and the axial spacing between each lenses and the like, the volume of the system can be effectively reduced, the sensitivity of the system is reduced and the processability of the system is improved, so that the optical imaging system is more beneficial to production and processing and can be applicable to portable electronic products. In addition, the optical imaging system configured above can also have advantageous effects such as ultrathin thickness, small size, large aperture, high imaging quality, etc.

In an embodiment of the disclosure, at least one of the lens surfaces of each lens is an aspherical lens surface. The aspherical lens has the features that the curvature varies continuously from the center of the lens to the periphery of the lens. Unlike a spherical lens having a constant curvature from the center of the lens to the periphery of the lens, an aspherical lens has better curvature radius characteristics, and has the advantages of improving distortion and improving astigmatic aberration. By adopting the aspherical lens, the aberration occurring during imaging can be eliminated as much as possible, thereby improving the imaging quality.

However, those skilled in the art should know that the number of the lenses forming the optical imaging system may be changed without departing from the technical solutions claimed in the disclosure to achieve each result and advantage described in the description. For example, although descriptions are made in the implementation mode with seven lenses as an example, the optical imaging system is not limited to seven lenses. If necessary, the optical imaging system may further include another number of lenses.

Specific embodiments of the optical imaging system applicable to the embodiments above are further described below with reference to the accompanying drawings.

Embodiment 1

An optical imaging system according to embodiment 1 of the disclosure is described below with reference to FIG. 1 to FIG. 2D. FIG. 1 shows a schematic structural view of an optical imaging system according to embodiment 1 of the disclosure.

As shown in FIG. 1, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 1 shows the surface type, curvature radius, thickness, material and conic coefficient of each lens of the optical imaging system of embodiment 1, wherein the units of the curvature radius and the thickness are both millimeter (mm).

TABLE 1

| Surface number | Surface type | Curvature radius | Thickness | Refractive index | Abbe number | Conic coefficient |
|---|---|---|---|---|---|---|
| OBJ | Sphere | Infinity | Infinity | | | |
| STO | Sphere | Infinity | −0.6000 | | | |
| S1 | Aspherical surface | 1.8215 | 0.8426 | 1.55 | 56.1 | −0.0906 |
| S2 | Aspherical surface | 8.2061 | 0.1382 | | | −13.3161 |
| S3 | Aspherical surface | −227.4292 | 0.4546 | 1.65 | 23.5 | −99.0000 |
| S4 | Aspherical surface | −333.3333 | 0.0524 | | | 99.0000 |
| S5 | Aspherical surface | 6.1100 | 0.2500 | 1.68 | 19.2 | 22.0550 |
| S6 | Aspherical surface | 3.7529 | 0.2688 | | | 7.8453 |
| S7 | Aspherical surface | −250.0000 | 0.3873 | 1.55 | 56.1 | −99.0000 |
| S8 | Aspherical surface | −19.7809 | 0.3642 | | | 23.5392 |
| S9 | Aspherical surface | −10.7070 | 0.3799 | 1.65 | 23.5 | 54.8639 |
| S10 | Aspherical surface | −10.6477 | 0.1972 | | | −29.9528 |
| S11 | Aspherical surface | 6.5512 | 0.3785 | 1.68 | 19.2 | −99.0000 |
| S12 | Aspherical surface | 4.8861 | 0.2496 | | | −39.0391 |
| S13 | Aspherical surface | 2.6739 | 0.5460 | 1.54 | 55.7 | −0.6903 |
| S14 | Aspherical surface | 1.7073 | 0.4161 | | | −0.8975 |
| S15 | Sphere | Infinity | 0.2100 | 1.52 | 64.2 | |
| S16 | Sphere | Infinity | 0.4103 | | | |
| S17 | Sphere | Infinity | | | | |

As can be determined from Table 1, an object-side surface and an image-side surface of any one of the first lens E1 to the seventh lens E7 are all aspherical surfaces. In the embodiment, the surface type x of each aspherical lens can be defined by, but is not limited to, the following aspherical formula:

$$x = \frac{ch^2}{1+\sqrt{1-(k+1)c^2h^2}} + \sum A_i h^i \quad (1)$$

wherein, x is the distance vector height from a vertex of the aspherical surface when the aspherical surface is at a height of h along the optical axis direction; c is the paraxial curvature of the aspherical surface, c=1/R (that is, the paraxial curvature c is the reciprocal of the curvature radius R in Table 1 above); k is the conic coefficient (given in Table 1); and Ai is the correction coefficient of the i-th order of the aspherical surface. Table 2 shows the higher order term coefficients $A_4$, $A_6$, $A_8$, $A_{10}$, $A_{12}$, $A_{14}$, $A_{16}$, $A_{18}$ and $A_{20}$ that can be used for each of aspherical lens surfaces S1-S14 in embodiment 1.

TABLE 2

| Surface number | A4 | A6 | A8 | A10 | A12 | A14 | A16 | A18 | A20 |
|---|---|---|---|---|---|---|---|---|---|
| S1 | 9.3984E−04 | −1.4241E−02 | 4.5529E−02 | −8.6489E−02 | 9.9292E−02 | −7.1064E−02 | 3.0874E−02 | −7.4851E−03 | 7.7395E−04 |
| S2 | −1.2164E−02 | 2.5617E−04 | −1.0874E−03 | 8.5633E−03 | −1.0878E−02 | 6.6203E−03 | −2.1397E−03 | 3.2787E−04 | −1.3479E−05 |
| S3 | −7.3263E−03 | 2.6394E−04 | 1.2216E−02 | −1.6279E−02 | 1.8783E−02 | −1.6161E−02 | 8.7066E−03 | −2.5558E−03 | 3.1607E−04 |
| S4 | −1.7700E−03 | 2.4464E−04 | −6.3335E−04 | 2.0720E−03 | −2.6951E−03 | 1.6091E−03 | −5.5396E−04 | 1.0147E−04 | −7.8847E−06 |
| S5 | −3.2560E−02 | −1.1551E−02 | 2.5100E−02 | −7.5281E−02 | 1.3011E−01 | −1.3412E−01 | 8.1567E−02 | −2.6910E−02 | 3.6787E−03 |
| S6 | −2.3848E−02 | 1.4849E−02 | −7.4202E−02 | 2.0054E−01 | −3.2274E−01 | 3.2516E−01 | −1.9672E−01 | 6.5618E−02 | −9.2267E−03 |
| S7 | −1.9919E−02 | 4.4035E−03 | −2.5473E−02 | 3.4874E−02 | −2.1120E−02 | −1.1577E−02 | 2.6190E−02 | −1.5316E−02 | 3.2277E−03 |
| S8 | −2.4045E−02 | −3.1983E−03 | −2.5589E−03 | −2.3204E−03 | 7.9027E−03 | −1.0895E−02 | 7.5881E−03 | −2.7213E−03 | 4.1286E−04 |
| S9 | −3.5895E−02 | 4.7549E−03 | −1.4475E−01 | 3.7512E−01 | −5.1055E−01 | 3.9905E−01 | −1.8143E−01 | 4.4444E−02 | −4.5019E−03 |
| S10 | 7.0291E−03 | −2.0419E−01 | 2.7004E−01 | −2.0752E−01 | 8.5691E−02 | −1.2200E−02 | −2.9210E−03 | 1.2153E−03 | −1.1747E−04 |
| S11 | 7.6409E−02 | −1.2360E−01 | 1.9500E−01 | −1.2737E−01 | 5.0916E−02 | −1.1181E−02 | 1.1637E−03 | −2.2637E−05 | −3.3909E−06 |
| S12 | −1.7105E−02 | −1.4637E−02 | −2.2165E−03 | 4.0094E−03 | −1.8733E−03 | 4.9939E−04 | −7.2599E−05 | 4.8005E−06 | −7.4651E−08 |
| S13 | −3.1455E−01 | 1.2949E−01 | −3.1959E−02 | 5.8273E−03 | −8.4398E−04 | 9.3610E−05 | −7.1613E−06 | 3.2518E−07 | −6.4932E−09 |
| S14 | −2.5933E−01 | 1.2818E−01 | −5.3066E−02 | 1.5588E−02 | −2.9955E−03 | 3.6370E−04 | −2.6751E−05 | 1.0853E−06 | −1.8607E−08 |

Table 3 shows effective focal lengths f1 to f7 of the lenses in embodiment 1, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 3

| f1 (mm) | 4.10 | f7 (mm) | −10.96 |
|---|---|---|---|
| f2 (mm) | −1112.41 | f (mm) | 4.92 |
| f3 (mm) | −15.00 | TTL (mm) | 5.55 |
| f4 (mm) | 39.33 | ImgH (mm) | 3.96 |
| f5 (mm) | 849.20 | HFOV (°) | 38.7 |
| f6 (mm) | −31.24 | | |

The optical imaging system in embodiment 1 satisfies:

f/EPID≤1.8, wherein f is the total effective focal length of the optical imaging system, and EPD is an entrance pupil diameter of the optical imaging system;

f*TAN(HFOV)=3.94 mm, wherein f is the total effective focal length of the optical imaging system, and HFOV is the maximum angle of half field of view of the optical imaging system;

f/f1=1.20, wherein f is the total effective focal length of the optical imaging system, and f1 is an effective focal length of the first lens E1;

f/f7=−0.45, wherein f is the total effective focal length of the optical imaging system, and f7 is an effective focal length of the seventh lens E7;

R2/(R1*2)=2.25, wherein R2 is a curvature radius of the image-side surface S2 of the first lens E1, and R1 is a curvature radius of the object-side surface S1 of the first lens E1;

(R13+R14)/(R11+R12)=0.38, wherein R13 is a curvature radius of the object-side surface S13 of the seventh lens E7, R14 is a curvature radius of the image-side surface S14 of the seventh lens E7, R11 is a curvature radius of the object-side surface S11 of the sixth lens E6, and R12 is a curvature radius of the image-side surface S12 of the sixth lens E6;

CT1/(CT2+CT3+CT4)=0.77, wherein CT1 is a center thickness of the first lens E1 on the optical axis, CT2 is a center thickness of the second lens E2 on the optical axis, CT3 is a center thickness of the third lens E3 on the optical axis, and CT4 is a center thickness of the fourth lens E4 on the optical axis;

T23/CT3=0.21, wherein T23 is a spacing distance between the second lens E2 and the third lens E3 on the optical axis, and CT3 is the center thickness of the third lens E3 on the optical axis;

f34/f56=0.77, wherein f34 is a combined focal length of the third lens E3 and the fourth lens E4, and f56 is a combined focal length of the fifth lens E5 and the sixth lens E6;

ΣCT/TTL=0.58, wherein ΣCT is a sum of the center thicknesses of the first lens E1 to the seventh lens E7 on the optical axis, and TTL is the distance from the object-side surface S1 of the first lens E1 to the imaging surface S17 on the optical axis.

Figure 2A:
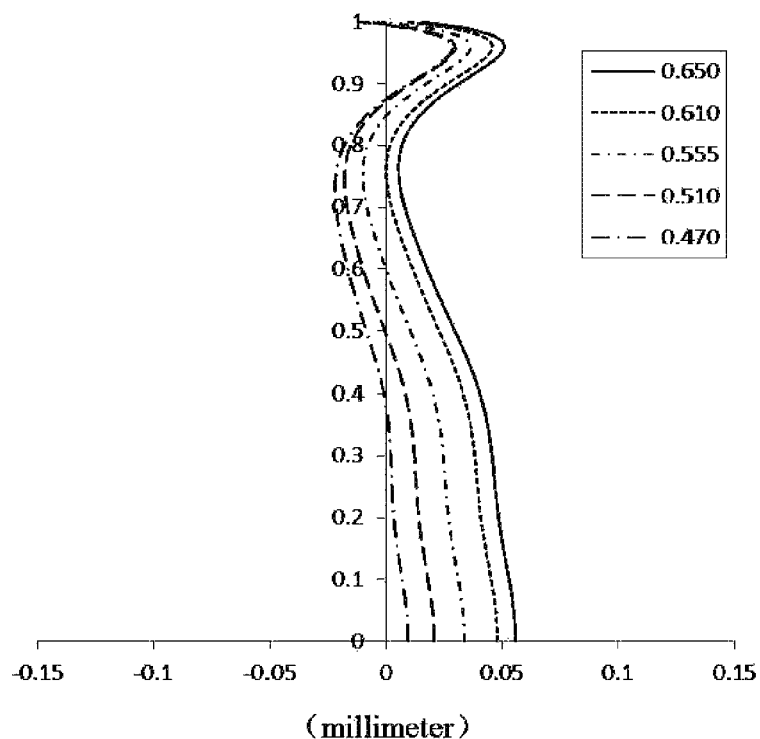
FIG. 2A to FIG. 2D show a longitudinal aberration curve, an astigmatism curve, a distortion curve, and a lateral color curve of the optical imaging system of embodiment 1, respectively.
Figure 2B:
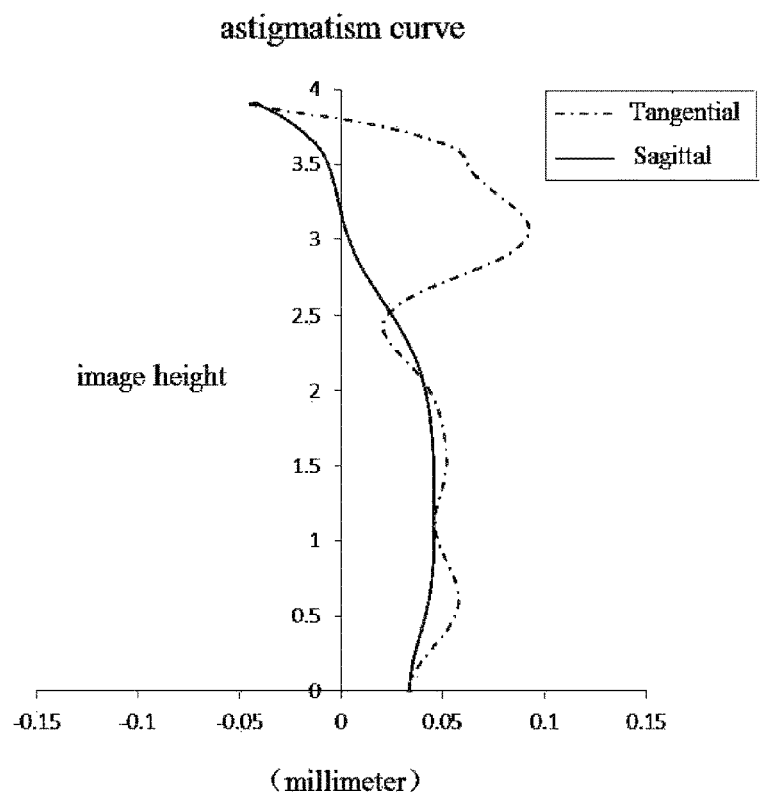
Figure 2C:
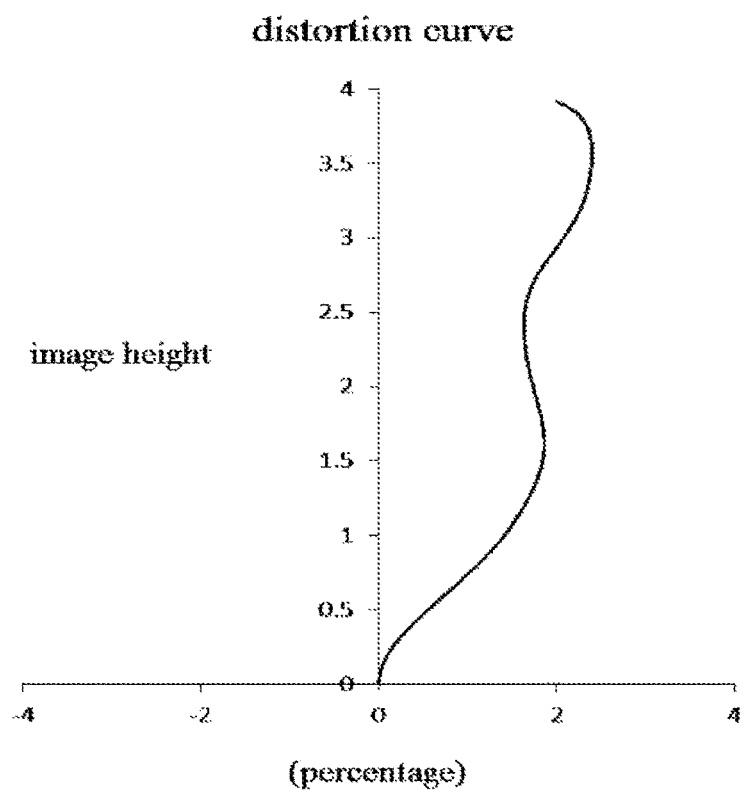
Figure 2D:
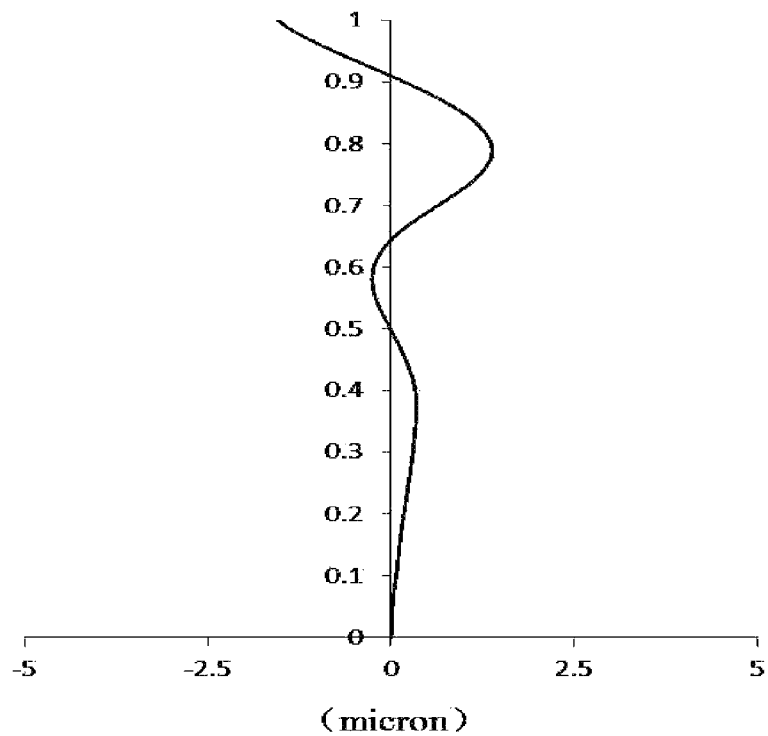

FIG. 2A shows a longitudinal aberration curve of the optical imaging system of embodiment 1, which represents convergence focus deviations of light rays of different wavelengths after passing through the system. FIG. 2B shows an astigmatism curve of the optical imaging system of embodiment 1, which represents a curvature of tangential image surface and a curvature of sagittal image surface. FIG. 2C shows a distortion curve of the optical imaging system of embodiment 1, which represents distortion values corresponding to different image heights. FIG. 2D shows a lateral color curve of the optical imaging system of embodiment 1, which represents deviations of light rays on different image heights of the imaging surface after passing through the system. According to FIG. 2A to FIG. 2D, the optical imaging system provided in embodiment 1 can achieve a good imaging quality.

Embodiment 2

Figure 3:
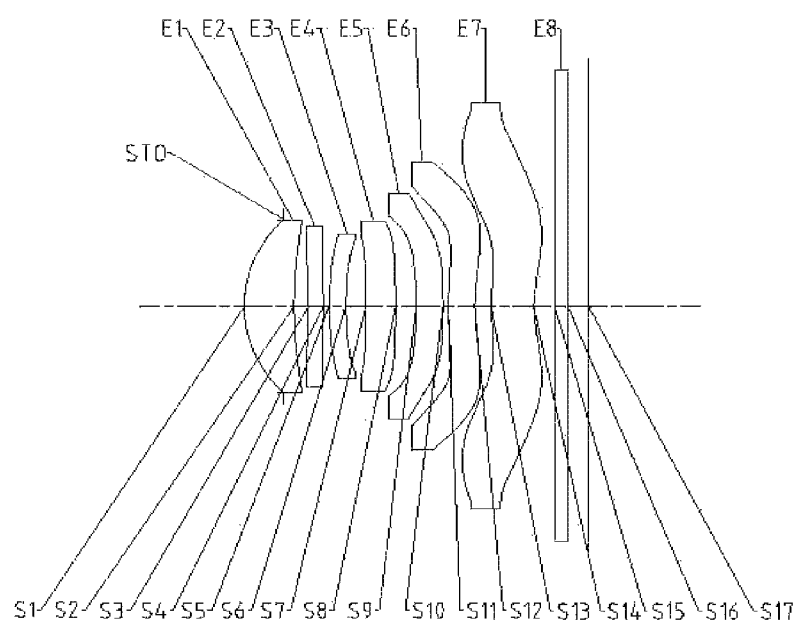
FIG. 3 shows a schematic structural view of an optical imaging system according to embodiment 2 of the disclosure.

An optical imaging system according to embodiment 2 of the disclosure will be described below with reference to FIG. 3 to FIG. 4D. In the embodiment and the following embodiments, for brevity, some description similar to embodiment 1 is omitted. FIG. 3 shows a schematic structural view of an optical imaging system according to embodiment 2 of the disclosure.

As shown in FIG. 3, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 4 shows the surface type, curvature radius, thickness, material and conic coefficient of each lens of the optical imaging system of embodiment 2, wherein the units of the curvature radius and the thickness are both millimeter (mm).

TABLE 4

| Surface number | Surface type | Curvature radius | Thickness | Material Refractive index | Abbe number | Conic coefficient |
|---|---|---|---|---|---|---|
| OBJ | Sphere | Infinity | Infinity | | | |
| STO | Sphere | Infinity | −0.6000 | | | |
| S1 | Aspherical surface | 1.8261 | 0.7970 | 1.55 | 56.1 | −0.0576 |
| S2 | Aspherical surface | 6.4631 | 0.2329 | | | −5.3030 |
| S3 | Aspherical surface | −22.8039 | 0.2400 | 1.65 | 23.5 | −99.0000 |
| S4 | Aspherical surface | −173.7305 | 0.0930 | | | 99.0000 |
| S5 | Aspherical surface | 4.7463 | 0.2701 | 1.68 | 19.2 | 12.0045 |
| S6 | Aspherical surface | 4.7704 | 0.3231 | | | 15.5098 |
| S7 | Aspherical surface | −250.0000 | 0.4813 | 1.55 | 56.1 | −99.0000 |
| S8 | Aspherical surface | −46.1215 | 0.3315 | | | 99.0000 |
| S9 | Aspherical surface | −9.4703 | 0.4335 | 1.65 | 23.5 | 37.9593 |
| S10 | Aspherical surface | −10.3291 | 0.0785 | | | −13.1544 |
| S11 | Aspherical surface | 4.1945 | 0.4290 | 1.68 | 19.2 | −99.0000 |
| S12 | Aspherical surface | 2.9855 | 0.2648 | | | −24.7506 |
| S13 | Aspherical surface | 2.8215 | 0.6860 | 1.54 | 55.7 | −0.6416 |
| S14 | Aspherical surface | 1.8771 | 0.3400 | | | −0.8407 |
| S15 | Sphere | Infinity | 0.2100 | 1.52 | 64.2 | |
| S16 | Sphere | Infinity | 0.3351 | | | |
| S17 | Sphere | Infinity | | | | |

As can be determined from Table 4, in embodiment 2, the object-side surface and the image-side surface of any one of the first lens E1 to the seventh lens E7 are all aspherical surfaces. Table 5 shows high-order coefficients which can be used for each aspherical lens surfaces in embodiment 2, wherein each aspherical surface type can be defined by equation (1) given in embodiment 1 above.

TABLE 5

| Surface number | A4 | A6 | A8 | A10 | A12 | A14 | A16 | A18 | A20 |
|---|---|---|---|---|---|---|---|---|---|
| S1 | 2.8352E−05 | −7.4615E−05 | 4.1434E−05 | −1.3671E−05 | 2.7259E−06 | −3.3885E−07 | 2.5568E−08 | −1.0766E−09 | 1.9330E−11 |
| S2 | −1.0730E−03 | 6.7109E−06 | −8.4606E−06 | 1.9788E−05 | −7.4654E−06 | 1.3494E−06 | −1.2953E−07 | 5.8947E−09 | −7.1974E−11 |
| S3 | −6.2381E−05 | 2.0738E−07 | 8.8565E−07 | −1.0891E−07 | 1.1595E−08 | −9.2057E−10 | 4.5765E−11 | −1.2396E−12 | 1.4146E−14 |
| S4 | −1.8624E−03 | 2.6405E−04 | −7.0120E−04 | 2.3531E−03 | −3.1396E−03 | 1.9228E−03 | −6.7901E−04 | 1.2758E−04 | −1.0169E−05 |
| S5 | −1.7308E−02 | −4.4768E−03 | 7.0929E−03 | −1.5510E−02 | 1.9545E−02 | −1.4689E−02 | 6.5133E−03 | −1.5667E−03 | 1.5615E−04 |
| S6 | −1.1788E−02 | 5.1608E−03 | −1.8131E−02 | 3.4451E−02 | −3.8982E−02 | 2.7613E−02 | −1.1745E−02 | 2.7545E−03 | −2.7231E−04 |
| S7 | −2.9382E−02 | 7.8890E−03 | −5.5425E−02 | 9.2159E−02 | −6.7785E−02 | −4.5130E−02 | 1.2399E−01 | −8.8066E−02 | 2.2541E−02 |
| S8 | −2.7768E−02 | −3.9692E−03 | −3.4127E−03 | −3.3255E−03 | 1.2171E−02 | −1.8032E−02 | 1.3496E−02 | −5.2014E−03 | 8.4803E−04 |
| S9 | −3.0220E−02 | 3.6732E−03 | −1.0260E−01 | 2.4397E−01 | −3.0467E−01 | 2.1850E−01 | −9.1152E−02 | 2.0488E−02 | −1.9042E−03 |
| S10 | 6.4405E−03 | −1.7909E−01 | 2.2671E−01 | −1.6677E−01 | 6.5919E−02 | −8.9837E−03 | −2.0589E−03 | 8.1997E−04 | −7.5864E−05 |
| S11 | 7.3303E−02 | −2.0070E−01 | 1.7947E−01 | −1.1482E−01 | 4.4955E−02 | −9.6694E−03 | 9.8567E−04 | −1.8780E−05 | −2.7555E−06 |
| S12 | −1.4592E−02 | −1.1532E−02 | −1.6129E−03 | 2.6946E−03 | −1.1628E−03 | 2.8631E−04 | −3.8443E−05 | 2.3478E−06 | −3.3720E−08 |
| S13 | −2.4437E−01 | 8.8671E−02 | −1.9289E−02 | 3.1001E−03 | −3.9574E−04 | 3.8689E−05 | −2.6088E−06 | 1.0441E−07 | −1.8377E−09 |
| S14 | −2.1062E−01 | 9.3822E−02 | −3.5004E−02 | 9.2666E−03 | −1.6048E−03 | 1.7560E−04 | −1.1640E−05 | 4.2557E−07 | −6.5756E−09 |

Table 6 shows effective focal lengths f1 to f7 of the lenses in embodiment 2, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 6

| f1 (mm) | 4.40 | f7 (mm) | −14.00 |
|---|---|---|---|
| f2 (mm) | −40.75 | f (mm) | 4.78 |
| f3 (mm) | 251.00 | TTL (mm) | 5.55 |
| f4 (mm) | 103.52 | ImgH (mm) | 3.96 |
| f5 (mm) | −220.29 | HFOV (°) | 39.5 |
| f6 (mm) | −17.84 | | |

Figure 4A:
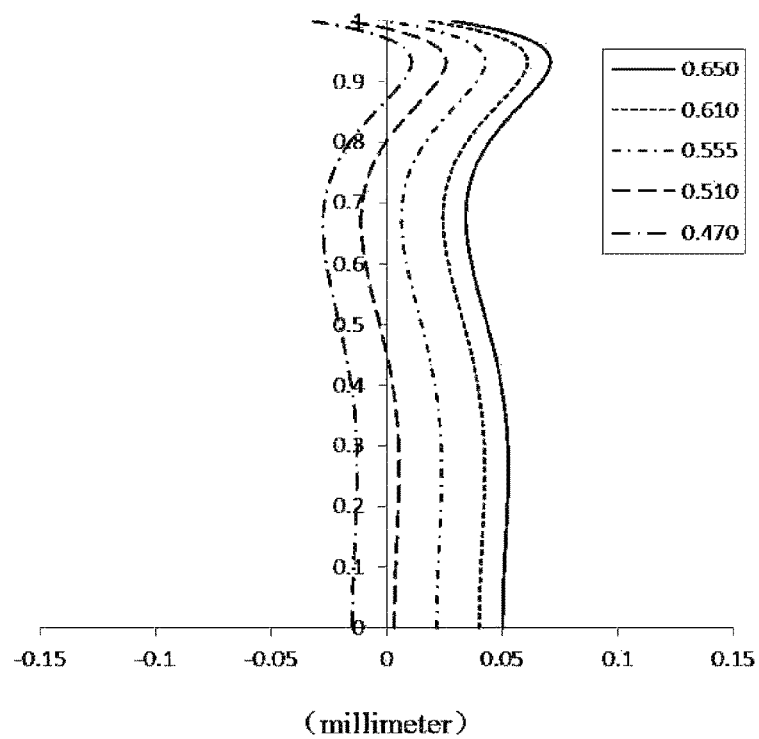
FIG. 4A to FIG. 4D show a longitudinal aberration curve, an astigmatism curve, a distortion curve, and a lateral color curve of the optical imaging system of embodiment 2, respectively.
Figure 4B:
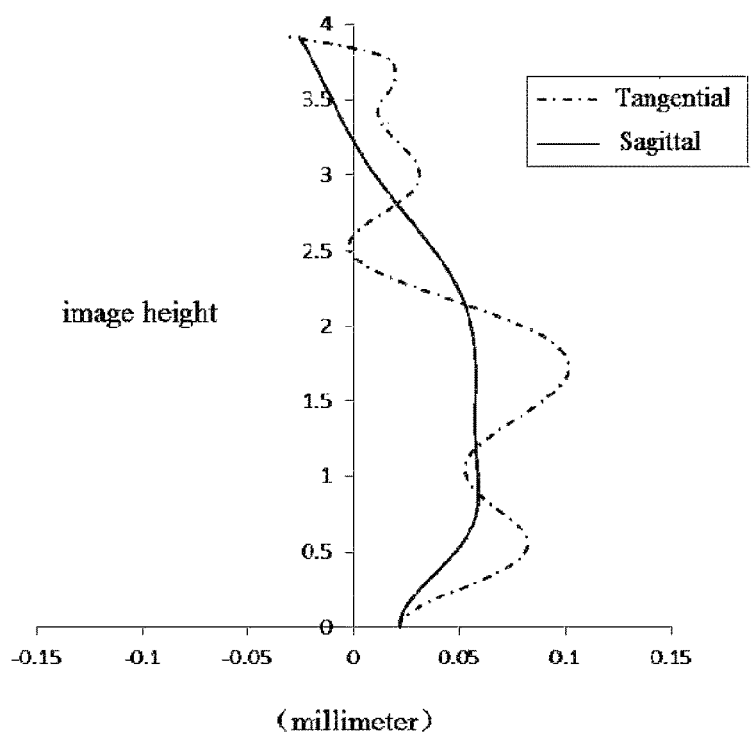
Figure 4C:
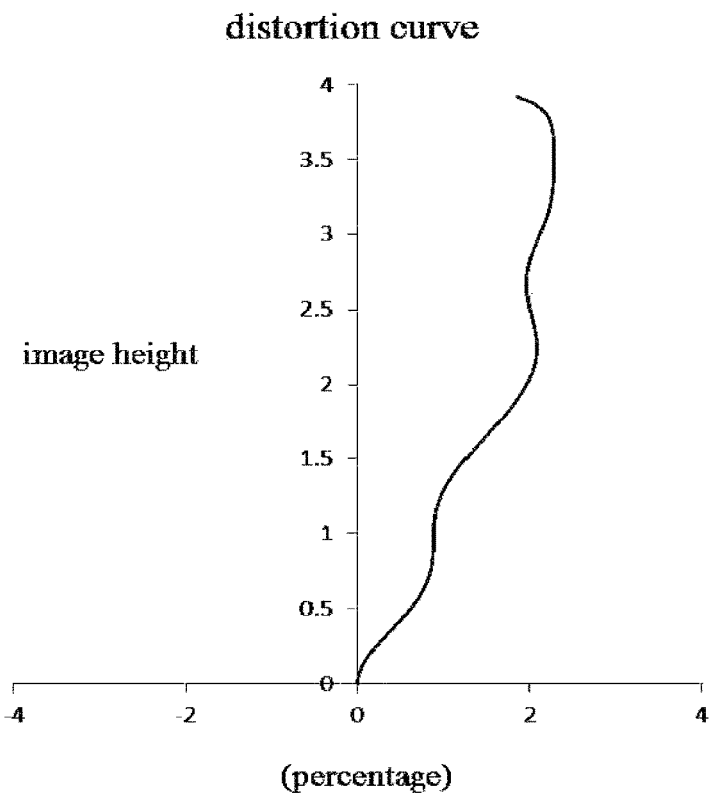
Figure 4D:
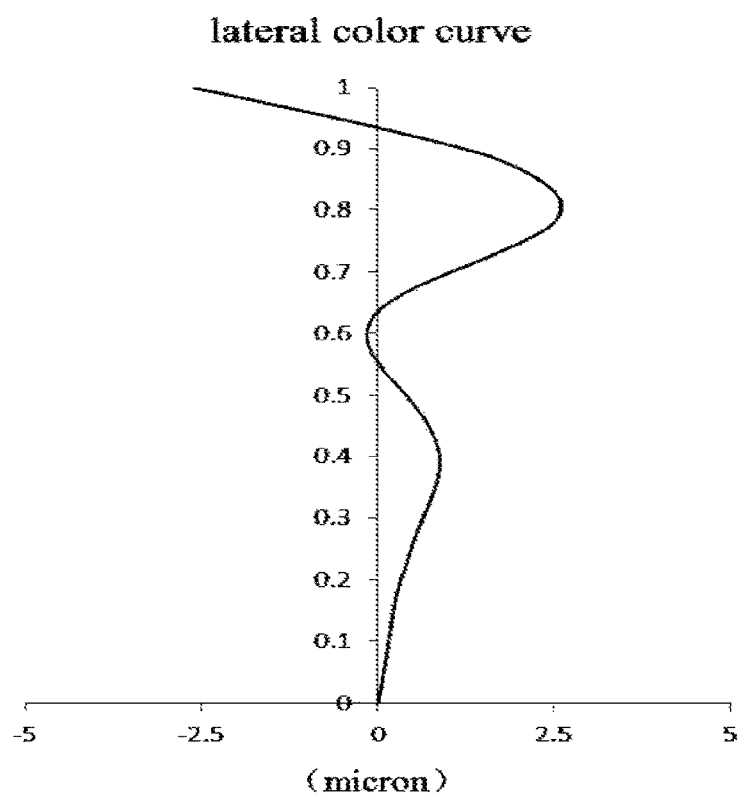

FIG. 4A shows a longitudinal aberration curve of the optical imaging system of embodiment 2, which represents convergence focus deviations of light rays of different wavelengths after passing through the system. FIG. 4B shows an astigmatism curve of the optical imaging system of embodiment 2, which represents a curvature of tangential image surface and a curvature of sagittal image surface. FIG. 4C shows a distortion curve of the optical imaging system of embodiment 2, which represents distortion values corresponding to different image heights. FIG. 4D shows a lateral color curve of the optical imaging system of embodiment 2, which represents deviations of light rays on different image heights of the imaging surface after passing through the system. According to FIG. 4A to FIG. 4D, the optical imaging system provided in embodiment 2 can achieve a good imaging quality.

Embodiment 3

Figure 5:
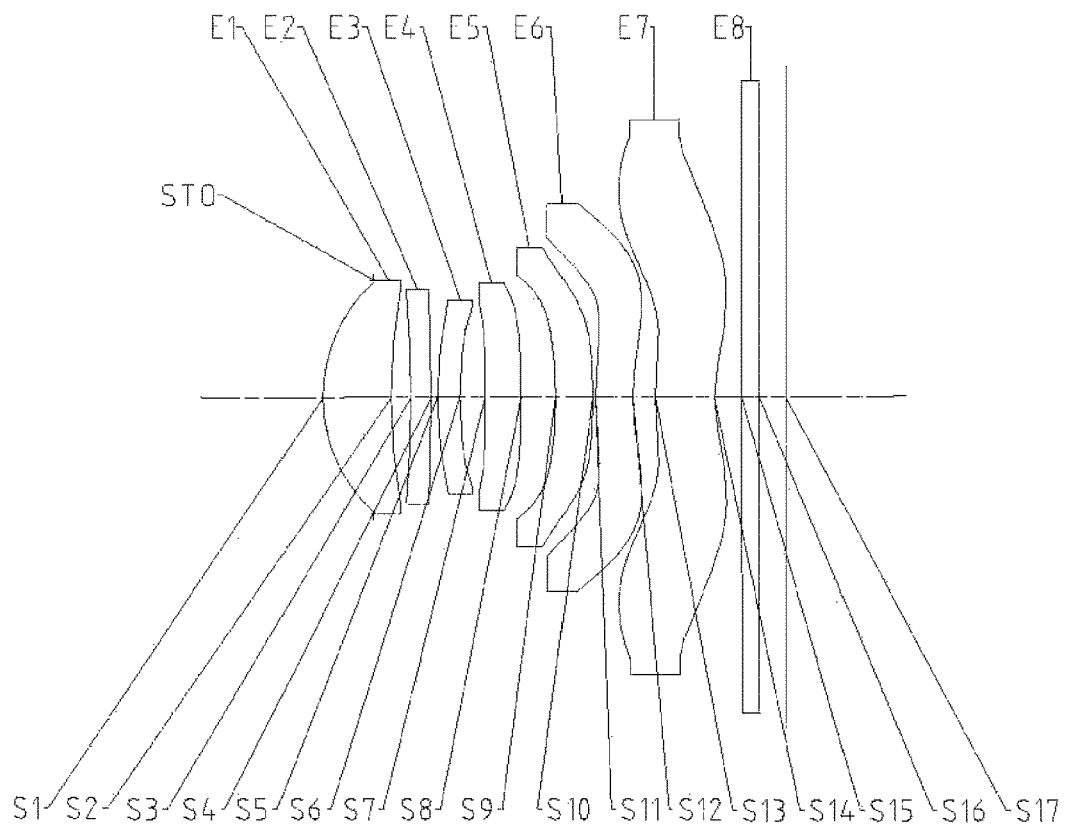
FIG. 5 shows a schematic structural view of an optical imaging system according to embodiment 3 of the disclosure.

An optical imaging system according to embodiment 3 of the disclosure will be described below with reference to FIG. 5 to FIG. 6D. FIG. 5 shows a schematic structural view of an optical imaging system according to embodiment 3 of the disclosure.

As shown in FIG. 5, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 7 shows the surface type, curvature radius, thickness, material and conic coefficient of each lens of the optical imaging system of embodiment 3, wherein the units of the curvature radius and the thickness are both millimeter (mm).

TABLE 7

| | | | | Material | | |
|---|---|---|---|---|---|---|
| Surface number | Surface type | Curvature radius | Thickness | Refractive index | Abbe number | Conic coefficient |
| OBJ | Sphere | Infinity | Infinity | | | |
| STO | Sphere | Infinity | −0.6000 | | | |
| S1 | Aspherical surface | 1.8366 | 0.8198 | 1.55 | 56.1 | −0.0274 |
| S2 | Aspherical surface | 7.2567 | 0.2360 | | | −5.2619 |
| S3 | Aspherical surface | −12.0255 | 0.2400 | 1.65 | 23.5 | −99.0000 |
| S4 | Aspherical surface | −42.0799 | 0.0791 | | | 99.0000 |
| S5 | Aspherical surface | 5.1115 | 0.2667 | 1.68 | 19.2 | 13.1292 |
| S6 | Aspherical surface | 5.1588 | 0.3037 | | | 18.1383 |
| S7 | Aspherical surface | −250.0000 | 0.4336 | 1.55 | 56.1 | 99.0000 |
| S8 | Aspherical surface | −21.6071 | 0.4124 | | | 99.0000 |
| S9 | Aspherical surface | −7.2776 | 0.4417 | 1.65 | 23.5 | 20.7935 |
| S10 | Aspherical surface | −7.3138 | 0.0300 | | | −7.9670 |
| S11 | Aspherical surface | 4.2127 | 0.4511 | 1.68 | 19.2 | −99.0000 |
| S12 | Aspherical surface | 2.8603 | 0.2690 | | | −20.8757 |
| S13 | Aspherical surface | 2.8056 | 0.7086 | 1.54 | 55.7 | −0.6651 |
| S14 | Aspherical surface | 1.8453 | 0.3245 | | | −0.8619 |
| S15 | Sphere | Infinity | 0.2100 | 1.52 | 64.2 | |
| S16 | Sphere | Infinity | 0.3196 | | | |
| S17 | Sphere | Infinity | | | | |

As can be determined from Table 7, in embodiment 3, the object-side surface and the image-side surface of any one of the first lens E1 to the seventh lens E7 are all aspherical surfaces. Table 8 shows high-order coefficients which can be used for each aspherical lens surfaces in embodiment 3, wherein each aspherical surface types can be defined by equation (1) given in embodiment 1 above.

TABLE 8

| Surface number | A4 | A6 | A8 | A10 | A12 | A14 | A16 | A18 | A20 |
|---|---|---|---|---|---|---|---|---|---|
| S1 | 1.1024E−04 | −5.7206E−04 | 6.2639E−04 | −4.0753E−04 | 1.6023E−04 | −3.9275E−05 | 5.8438E−06 | −4.8522E−07 | 1.7183E−08 |
| S2 | −1.1654E−03 | 7.5964E−06 | −9.9808E−06 | 2.4328E−05 | −9.5654E−06 | 1.8019E−06 | −1.8026E−07 | 8.5495E−09 | −1.0879E−10 |
| S3 | 0.0000E+00 | −1.2586E−226 | 0.0000E+00 | 0.0000E+00 | 0.0000E+00 | 0.0000E+00 | 0.0000E+00 | 0.0000E+00 | 0.0000E+00 |
| S4 | −2.0789E−03 | 3.1138E−04 | −8.7362E−04 | 3.0974E−03 | −4.3661E−03 | 2.8251E−03 | −1.0540E−03 | 2.0922E−04 | −1.7619E−05 |
| S5 | −1.9735E−02 | −5.4505E−03 | 9.2209E−03 | −2.1531E−02 | 2.8971E−02 | −2.3250E−02 | 1.1008E−02 | −2.8273E−03 | 3.0090E−04 |
| S6 | −8.0844E−03 | 2.9309E−03 | −8.5272E−03 | 1.3418E−02 | −1.2573E−02 | 7.3753E−03 | −2.5979E−03 | 5.0455E−04 | −4.1307E−05 |
| S7 | −3.0076E−02 | 8.1703E−03 | −5.8076E−02 | 9.7701E−02 | −7.2706E−02 | −4.8975E−02 | 1.3614E−01 | −9.7828E−02 | 2.5334E−02 |
| S8 | −3.0162E−02 | −4.4933E−03 | −4.0264E−03 | −4.0891E−03 | 1.5598E−02 | −2.4084E−02 | 1.8787E−02 | −7.5460E−03 | 1.2822E−03 |
| S9 | −2.7119E−02 | 3.1225E−03 | −8.2623E−02 | 1.8611E−01 | −2.2017E−01 | 1.4957E−01 | −5.9109E−02 | 1.2586E−02 | −1.1081E−03 |
| S10 | 6.5211E−03 | −1.8246E−01 | 2.3242E−01 | −1.7204E−01 | 6.8423E−02 | −9.3831E−03 | −2.1638E−03 | 8.6713E−04 | −8.0728E−05 |
| S11 | 7.4237E−02 | −2.0455E−01 | 1.8407E−01 | −1.1851E−01 | 4.6695E−02 | −1.0107E−02 | 1.0369E−03 | −1.9881E−05 | −2.9355E−06 |
| S12 | −1.4444E−02 | −1.1357E−02 | −1.5804E−03 | 2.6270E−03 | 1.1279E−03 | 2.7630E−04 | −3.6911E−05 | 2.2428E−06 | −3.2049E−08 |
| S13 | −2.3677E−01 | 8.4569E−02 | −1.8109E−02 | 2.8648E−03 | −3.5998E−04 | 3.4642E−05 | −2.2993E−06 | 9.0584E−08 | −1.5693E−09 |
| S14 | −1.9798E−01 | 8.5502E−02 | −3.0928E−02 | 7.9380E−03 | −1.3328E−03 | 1.4139E−04 | −9.0869E−06 | 3.2211E−07 | −4.8252E−09 |

Table 9 shows effective focal lengths f1 to f7 of the lenses in embodiment 3, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 9

| f1 (mm) | 4.28 | f7 (mm) | −13.53 |
|---|---|---|---|
| f2 (mm) | −26.20 | f (mm) | 4.74 |
| f3 (mm) | 251.00 | TTL (mm) | 5.55 |
| f4 (mm) | 43.30 | ImgH (mm) | 3.96 |
| f5 (mm) | 603.00 | HFOV (°) | 39.7 |
| f6 (mm) | −15.20 | | |

Figure 6A:
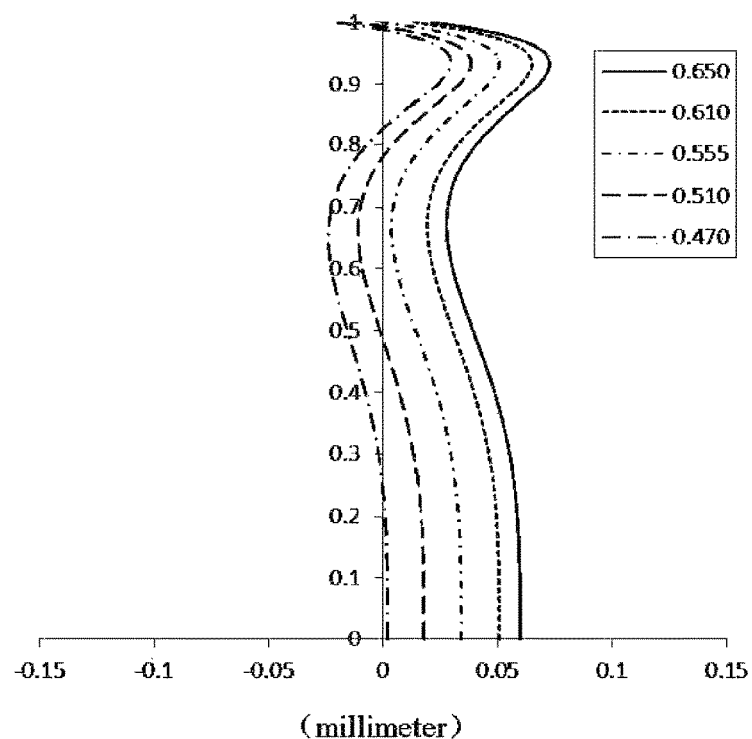
FIG. 6A to FIG. 6D show a longitudinal aberration curve, an astigmatism curve, a distortion curve, and a lateral color curve of the optical imaging system of embodiment 3, respectively.
Figure 6B:
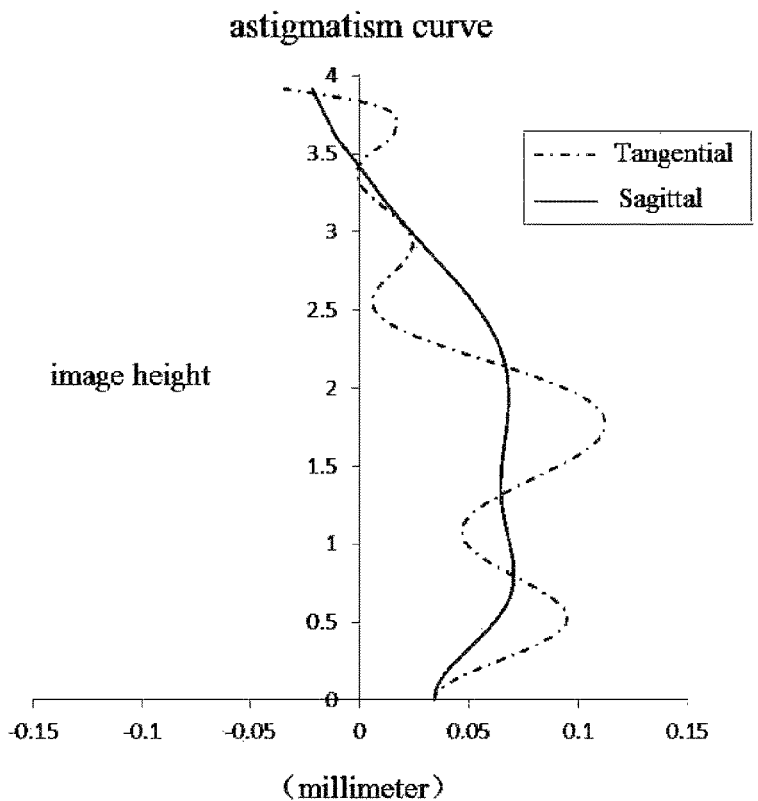
Figure 6C:
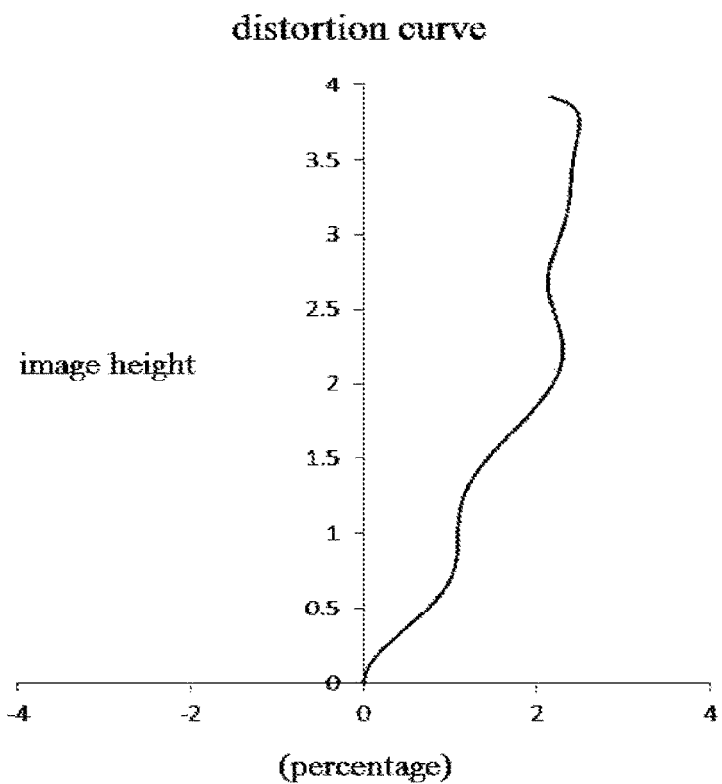
Figure 6D:
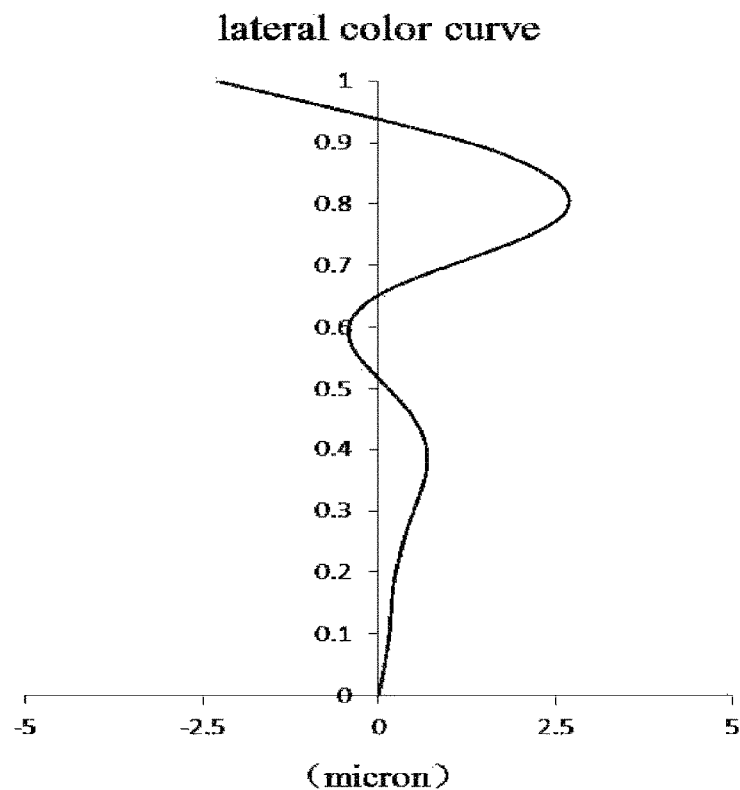

FIG. 6A shows a longitudinal aberration curve of the optical imaging system of embodiment 3, which represents convergence focus deviations of light rays of different wavelengths after passing through the system. FIG. 6B shows an astigmatism curve of the optical imaging system of embodiment 3, which represents a curvature of tangential image surface and a curvature of sagittal image surface. FIG. 6C shows a distortion curve of the optical imaging system of embodiment 3, which represents distortion values corresponding to different image heights. FIG. 6D shows a lateral color curve of the optical imaging system of embodiment 3, which represents deviations of light rays on different image heights of the imaging surface after passing through the system. According to FIG. 6A to FIG. 6D, the optical imaging system provided in embodiment 3 can achieve a good imaging quality.

Embodiment 4

Figure 7:
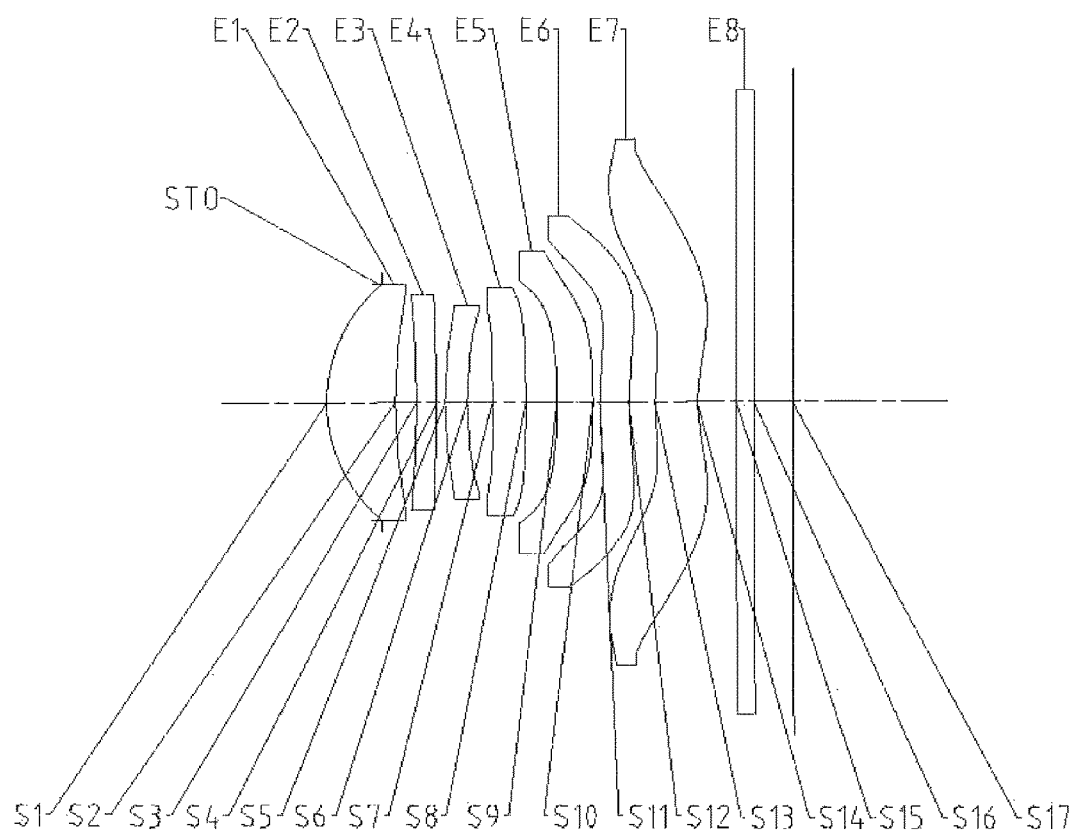
FIG. 7 shows a schematic structural view of an optical imaging system according to embodiment 4 of the disclosure.

An optical imaging system according to embodiment 4 of the disclosure will be described below with reference to FIG. 7 to FIG. 8D. FIG. 7 shows a schematic structural view of an optical imaging system according to embodiment 4 of the disclosure.

As shown in FIG. 7, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 10 shows the surface type, curvature radius, thickness, material and conic coefficient of each lens of the optical imaging system of embodiment 4, wherein the units of the curvature radius and the thickness are both millimeter (mm).

TABLE 10

| Surface number | Surface type | Curvature radius | Thickness | Material Refractive index | Material Abbe number | Conic coefficient |
|---|---|---|---|---|---|---|
| OBJ | Sphere | Infinity | Infinity | | | |
| STO | Sphere | Infinity | −0.6000 | | | |
| S1 | Aspherical surface | 1.8229 | 0.8137 | 1.55 | 56.1 | −0.0273 |
| S2 | Aspherical surface | 6.6070 | 0.2563 | | | −4.0733 |
| S3 | Aspherical surface | −10.9236 | 0.2400 | 1.65 | 23.5 | −80.7142 |
| S4 | Aspherical surface | −28.6913 | 0.0973 | | | 99.0000 |
| S5 | Aspherical surface | 5.3654 | 0.2644 | 1.68 | 19.2 | 16.1565 |
| S6 | Aspherical surface | 5.4334 | 0.2998 | | | 20.2761 |

TABLE 10-continued

| Surface number | Surface type | Curvature radius | Thickness | Material Refractive index | Abbe number | Conic coefficient |
|---|---|---|---|---|---|---|
| S7 | Aspherical surface | −250.0000 | 0.3977 | 1.55 | 56.1 | 99.0000 |
| S8 | Aspherical surface | −76.4412 | 0.3710 | | | −99.0000 |
| S9 | Aspherical surface | −8.8618 | 0.4179 | 1.65 | 23.5 | 33.9979 |
| S10 | Aspherical surface | −8.2932 | 0.0795 | | | −16.2757 |
| S11 | Aspherical surface | 4.3368 | 0.3462 | 1.68 | 19.2 | −99.0000 |
| S12 | Aspherical surface | 4.2351 | 0.3117 | | | −27.2460 |
| S13 | Aspherical surface | 2.9385 | 0.5018 | 1.54 | 55.7 | −0.6346 |
| S14 | Aspherical surface | 1.7727 | 0.4644 | | | −0.8846 |
| S15 | Sphere | Infinity | 0.2100 | 1.52 | 64.2 | |
| S16 | Sphere | Infinity | 0.4595 | | | |
| S17 | Sphere | Infinity | | | | |

As can be determined from Table 10, in embodiment 4, the object-side surface and the image-side surface of any one of the first lens E1 to the seventh lens E7 are all aspherical surfaces. Table 11 shows high-order coefficients which can be used for each aspherical lens surfaces in embodiment 4, wherein each aspherical surface types can be defined by equation (1) given in embodiment 1 above.

TABLE 11

| Surface number | A4 | A6 | A8 | A10 | A12 | A14 | A16 | A18 | A20 |
|---|---|---|---|---|---|---|---|---|---|
| S1 | 8.6504E−05 | −3.9765E−04 | 3.8571 E−04 | −2.2229E−04 | 7.7422E−05 | −1.6811E−05 | 2.2157E−06 | −1.6297E−07 | 5.1125E−09 |
| S2 | −1.0878E−03 | 6.8509E−06 | −8.6966E−06 | 2.0480E−05 | −7.7800E−06 | 1.4160E−06 | −1.3686E−07 | 6.2713E−09 | −7.7100E−11 |
| S3 | 0.0000E+00 | −1.6712E−226 | 0.0000E+00 | 0.0000E+00 | 0.0000E+00 | 0.0000E+00 | 0.0000E+00 | 0.0000E+00 | 0.0000E+00 |
| S4 | −1.7191E−03 | 2.3415E−04 | −5.9739E−04 | 1.9260E−03 | −2.4689E−03 | 1.4527E−03 | −4.9285E−04 | 8.8967E−05 | −6.8129E−06 |
| S5 | −2.4911E−02 | −7.7298E−03 | 1.4692E−02 | −3.8542E−02 | 5.8267E−02 | −5.2537E−02 | 2.7946E−02 | −8.0642E−03 | 9.6426E−04 |
| S6 | −1.2086E−02 | 5.3573E−03 | −1.9057E−02 | 3.6666E−02 | −4.2007E−02 | 3.0129E−02 | −1.2976E−02 | 3.0813E−03 | −3.0844E−04 |
| S7 | −2.6890E−02 | 6.9069E−03 | −4.6422E−02 | 7.3843E−02 | −5.1958E−02 | −3.3093E−02 | 8.6981E−02 | −5.9101E−02 | 1.4471E−02 |
| S8 | −2.6355E−02 | −3.6701E−03 | −3.0742E−03 | −2.9184E−03 | 1.0406E−02 | −1.5019E−02 | 1.0951E−02 | −4.1119E−03 | 6.5310E−04 |
| S9 | −2.8838E−02 | 3.4240E−03 | −9.3430E−02 | 2.1702E−01 | −2.6475E−01 | 1.8547E−01 | −7.5583E−02 | 1.6596E−02 | −1.5068E−03 |
| S10 | 6.4421E−03 | −1.7915E−01 | 2.2682E−01 | −1.6687E−01 | 6.5966E−02 | −8.9913E−03 | −2.0609E−03 | 8.2086E−04 | −7.5956E−05 |
| S11 | 7.6022E−02 | −2.1197E−01 | 1.9303E−01 | −1.2576E−01 | 5.0144E−02 | −1.0984E−02 | 1.1402E−03 | −2.2124E−05 | −3.5937E−06 |
| S12 | −1.6675E−02 | −1.4088E−02 | −2.1064E−03 | 3.7621E−03 | −1.7355E−03 | 4.5681E−04 | −6.5568E−05 | 4.2808E−06 | −6.5726E−08 |
| S13 | −2.5532E−01 | 9.4696E−02 | −2.1056E−02 | 3.4591E−03 | −4.5135E−04 | 4.5103E−05 | −3.1087E−06 | 1.2718E−07 | −2.2879E−09 |
| S14 | −2.5113E−01 | 1.2215E−01 | −4.9764E−02 | 1.4385E−02 | −2.7203E−03 | 3.2503E−04 | −2.3526E−05 | 9.3924E−07 | −1.5847E−08 |

Table 12 shows effective focal lengths f1 to f7 of the lenses in embodiment 4, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 12

| f1 (mm) | 4.35 | f7 (mm) | −9.80 |
|---|---|---|---|
| f2 (mm) | −27.51 | f (mm) | 4.84 |
| f3 (mm) | 246.11 | TTL (mm) | 5.53 |
| f4 (mm) | 201.55 | ImgH (mm) | 3.96 |
| f5 (mm) | 155.69 | HFOV (°) | 39.1 |
| f6 (mm) | 711.00 | | |

Figure 8A:
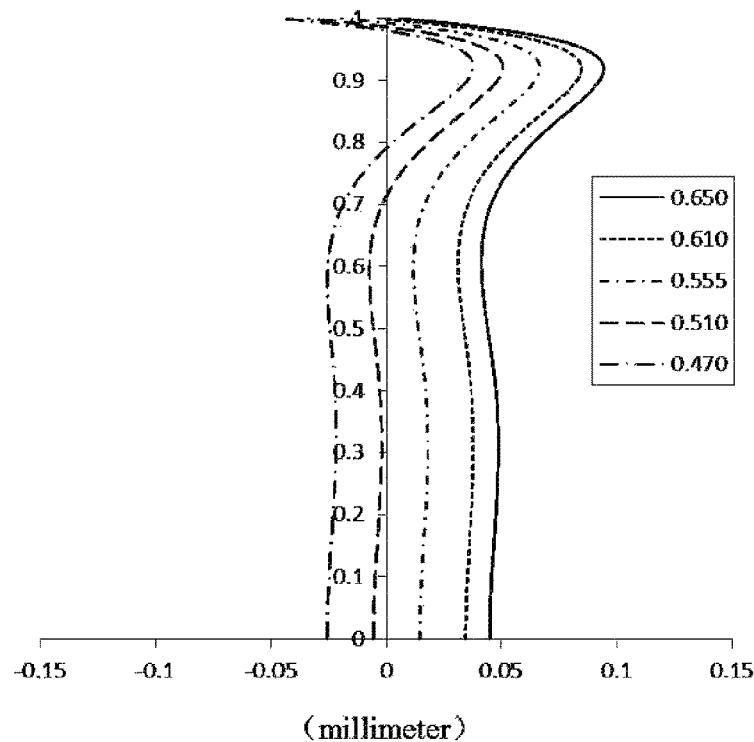
FIG. 8A to FIG. 8D show a longitudinal aberration curve, an astigmatism curve, a distortion curve, and a lateral color curve of the optical imaging system of embodiment 4, respectively.
Figure 8B:
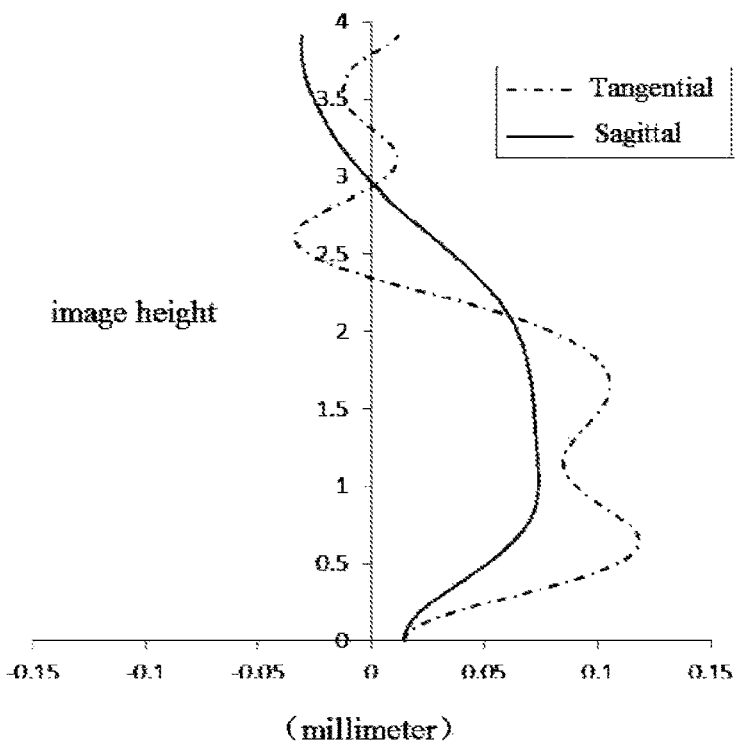
Figure 8C:
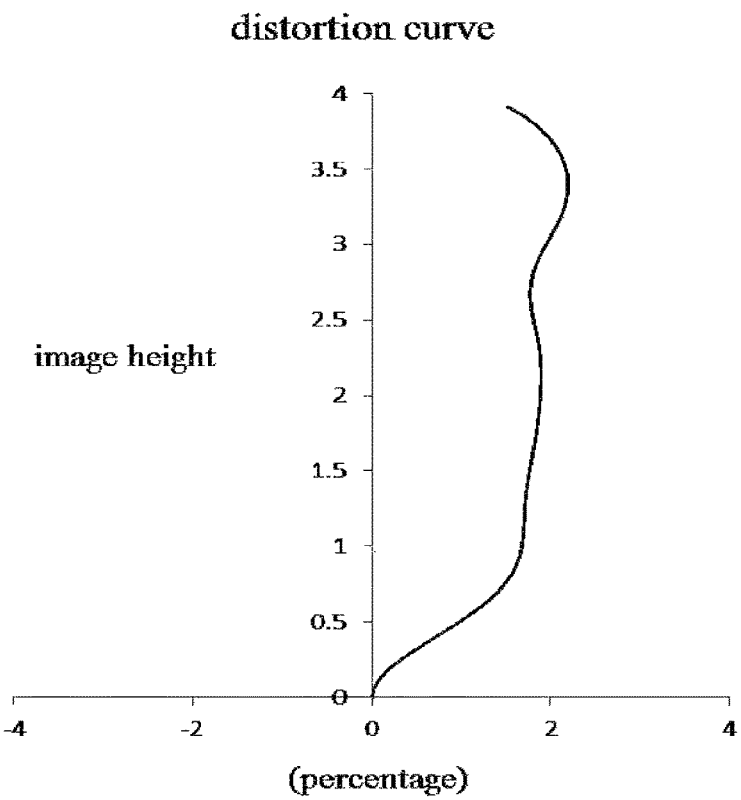
Figure 8D:
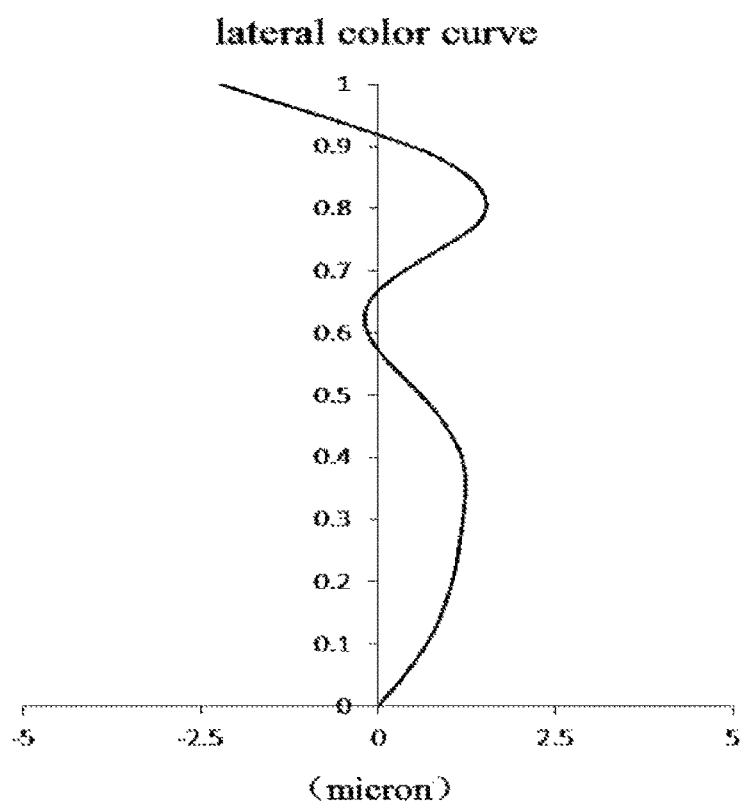

FIG. 8A shows a longitudinal aberration curve of the optical imaging system of embodiment 4, which represents convergence focus deviations of light rays of different wavelengths after passing through the system. FIG. 8B shows an astigmatism curve of the optical imaging system of embodiment 4, which represents a curvature of tangential image surface and a curvature of sagittal image surface. FIG. 8C shows a distortion curve of the optical imaging system of embodiment 4, which represents distortion values corresponding to different image heights. FIG. 8D shows a lateral color curve of the optical imaging system of embodiment 4, which represents deviations of light rays on different image heights of the imaging surface after passing through the system. According to FIG. 8A to FIG. 8D, the optical imaging system provided in embodiment 4 can achieve a good imaging quality.

Embodiment 5

Figure 9:
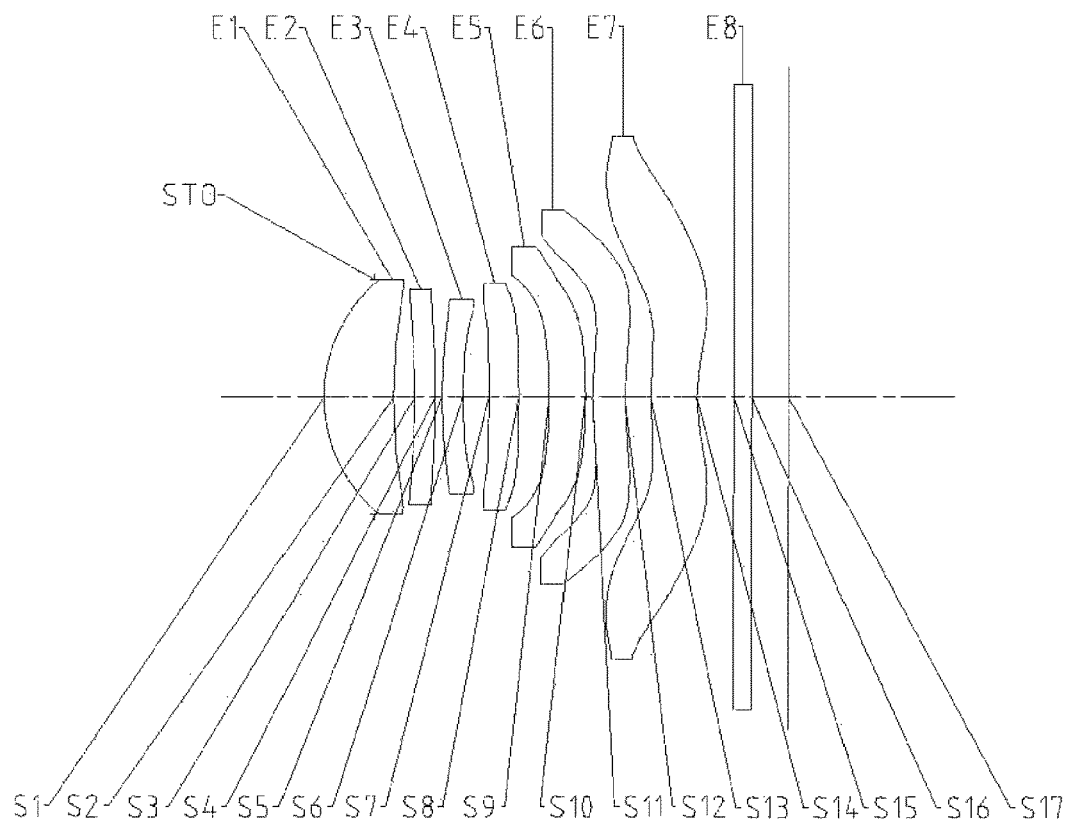
FIG. 9 shows a schematic structural view of an optical imaging system according to embodiment 5 of the disclosure.

An optical imaging system according to embodiment 5 of the disclosure will be described below with reference to FIG. 9 to FIG. 10D. FIG. 9 shows a schematic structural view of an optical imaging system according to embodiment 5 of the disclosure.

As shown in FIG. 9, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 13 shows the surface type, curvature radius, thickness, material and conic coefficient of each lens of the optical imaging system of embodiment 5, wherein the units of the curvature radius and the thickness are both millimeter (mm).

TABLE 13

| Surface number | Surface type | Curvature radius | Thickness | Material Refractive index | Abbe number | Conic coefficient |
|---|---|---|---|---|---|---|
| OBJ | Sphere | Infinity | Infinity | | | |
| STO | Sphere | Infinity | −0.6000 | | | |
| S1 | Aspherical surface | 1.8138 | 0.8302 | 1.55 | 56.1 | −0.0002 |
| S2 | Aspherical surface | 6.7411 | 0.2552 | | | −3.3795 |
| S3 | Aspherical surface | −10.2612 | 0.2400 | 1.65 | 23.5 | −75.4844 |
| S4 | Aspherical surface | −21.4641 | 0.0813 | | | 99.0000 |
| S5 | Aspherical surface | 5.7468 | 0.2500 | 1.68 | 19.2 | 18.0865 |
| S6 | Aspherical surface | 5.3788 | 0.3143 | | | 19.6389 |

TABLE 13-continued

| Surface number | Surface type | Curvature radius | Thickness | Material Refractive index | Abbe number | Conic coefficient |
|---|---|---|---|---|---|---|
| S7 | Aspherical surface | −250.0000 | 0.3528 | 1.55 | 56.1 | 99.0000 |
| S8 | Aspherical surface | −99.7595 | 0.3665 | | | −99.0000 |
| S9 | Aspherical surface | −9.0086 | 0.4275 | 1.65 | 23.5 | 35.6188 |
| S10 | Aspherical surface | −8.9683 | 0.0833 | | | −11.1933 |
| S11 | Aspherical surface | 4.0356 | 0.3860 | 1.68 | 19.2 | −99.0000 |
| S12 | Aspherical surface | 3.9125 | 0.3117 | | | −31.3988 |
| S13 | Aspherical surface | 2.9599 | 0.5471 | 1.54 | 55.7 | −0.6715 |
| S14 | Aspherical surface | 1.8229 | 0.4473 | | | −0.9029 |
| S15 | Sphere | Infinity | 0.2100 | 1.52 | 64.2 | |
| S16 | Sphere | Infinity | 0.4424 | | | |
| S17 | Sphere | Infinity | | | | |

As can be determined from Table 13, in embodiment 5, the object-side surface and the image-side surface of any one of the first lens E1 to the seventh lens E7 are all aspherical surfaces. Table 14 shows high-order coefficients which can be used for each aspherical lens surfaces in embodiment 5, wherein each aspherical surface types can be defined by equation (1) given in embodiment 1 above.

TABLE 14

| Surface number | A4 | A6 | A8 | A10 | A12 | A14 | A16 | A18 | A20 |
|---|---|---|---|---|---|---|---|---|---|
| S1 | 1.4089E−04 | −8.2659E−04 | 1.0232E−03 | −7.5260E−04 | 3.3453E−04 | −9.2702E−05 | 1.5594E−05 | −1.4638E−06 | 5.8603E−08 |
| S2 | −1.0009E−03 | 6.0467E−06 | −7.3629E−06 | 1.6633E−05 | −6.0607E−06 | 1.0581E−06 | −9.8097E−08 | 4.3120E−09 | −5.0851E−11 |
| S3 | 0.0000E+00 | 4.5658E−226 | 0.0000E+00 | 0.0000E+00 | 0.0000E+00 | 0.0000E+00 | 0.0000E+00 | 0.0000E+00 | 0.0000E+00 |
| S4 | −1.8317E−03 | 2.5754E−04 | −6.7824E−04 | 2.2572E−03 | −2.9867E−03 | 1.8140E−03 | −6.3527E−04 | 1.1837E−04 | −9.3569E−06 |
| S5 | −2.7627E−02 | −9.0280E−03 | 1.8071E−02 | −4.9925E−02 | 7.9482E−02 | −7.5472E−02 | 4.2279E−02 | −1.2848E−02 | 1.6179E−03 |
| S6 | −1.2648E−02 | 5.7356E−03 | −2.0872E−02 | 4.1081E−02 | −4.8149E−02 | 3.5328E−02 | −1.5565E−02 | 3.7812E−03 | −3.8721E−04 |
| S7 | −2.6259E−02 | 6.6652E−03 | −4.4269E−02 | 6.9586E−02 | −4.8386E−02 | −3.0454E−02 | 7.9099E−02 | −5.3111E−02 | 1.2851E−02 |
| S8 | −2.8151E−02 | −4.0515E−03 | −3.5074E−03 | −3.4413E−03 | 1.2682E−02 | −1.8917E−02 | 1.4256E−02 | −5.5319E−03 | 9.0811E−04 |
| S9 | −2.8351E−02 | 3.3378E−03 | −9.0305E−02 | 2.0798E−01 | −2.5158E−01 | 1.7475E−01 | −7.0612E−02 | 1.5373E−02 | −1.3839E−03 |
| S10 | 6.6802E−03 | −1.8918E−01 | 2.4390E−01 | −1.8272E−01 | 7.3555E−02 | −1.0209E−02 | −2.3829E−03 | 9.6649E−04 | −9.1070E−05 |
| S11 | 7.7803E−02 | −2.1947E−01 | 2.0218E−01 | −1.3326E−01 | 5.3753E−02 | −1.1911E−02 | 1.2509E−03 | −2.4555E−05 | −3.7117E−06 |
| S12 | −1.6049E−02 | −1.3302E−02 | −1.9511E−03 | 3.4186E−03 | −1.5471E−03 | 3.9950E−04 | −5.6255E−05 | 3.6031E−06 | −5.4271E−08 |
| S13 | −2.4058E−01 | 8.6619E−02 | −1.8696E−02 | 2.9815E−03 | −3.7764E−04 | 3.6633E−05 | −2.4509E−06 | 9.7331E−08 | −1.6997E−09 |
| S14 | −2.3056E−01 | 1.0745E−01 | −4.1945E−02 | 1.1618E−02 | −2.1051E−03 | 2.4099E−04 | −1.6714E−05 | 6.3935E−07 | −1.0336E−08 |

Table 15 shows effective focal lengths f1 to f7 of the lenses in embodiment 5, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 15

| f1 (mm) | 4.29 | f7 (mm) | −10.63 |
|---|---|---|---|
| f2 (mm) | −30.76 | f (mm) | 4.83 |
| f3 (mm) | −170.88 | TTL (mm) | 5.55 |
| f4 (mm) | 303.85 | ImgH (mm) | 3.96 |
| f5 (mm) | 603.00 | HFOV (°) | 39.1 |
| f6 (mm) | 711.00 | | |

Figure 10A:
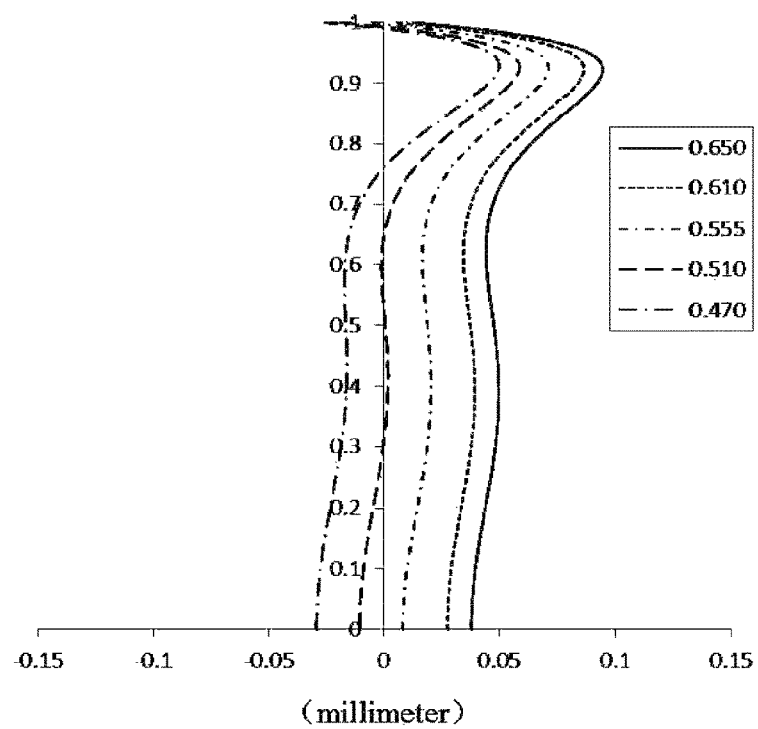
FIG. 10A to FIG. 10D show a longitudinal aberration curve, an astigmatism curve, a distortion curve, and a lateral color curve of the optical imaging system of embodiment 5, respectively.
Figure 10B:
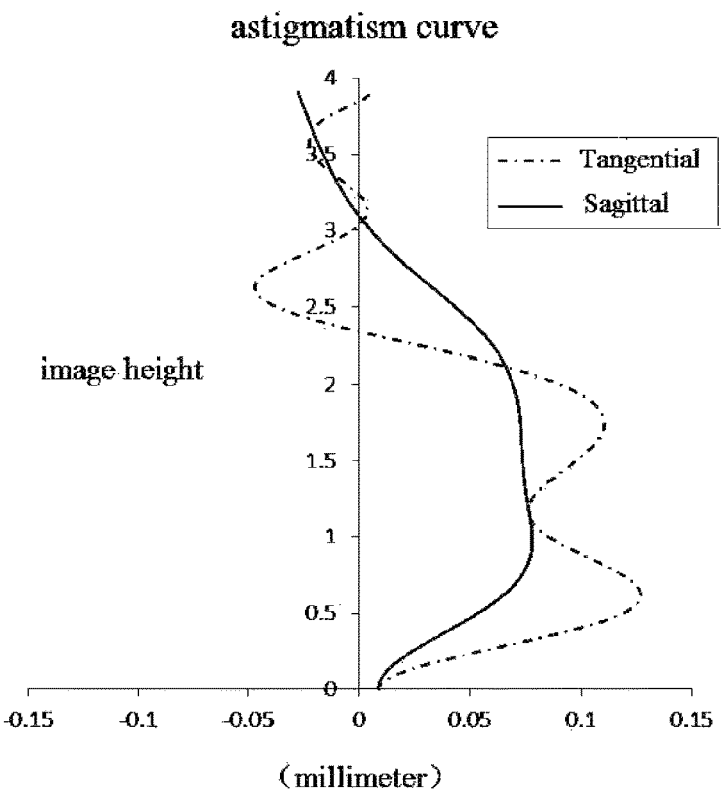
Figure 10C:
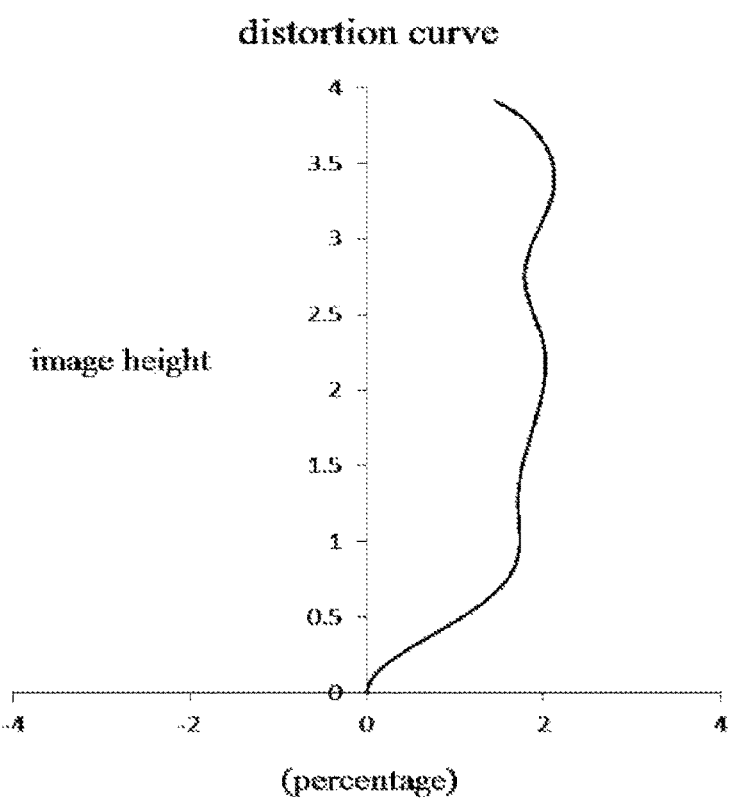
Figure 10D:
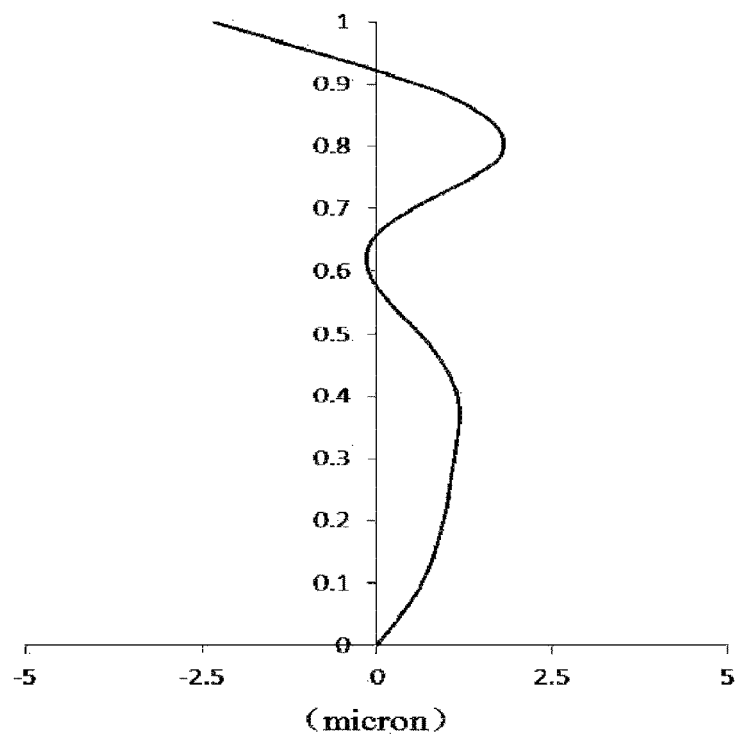

FIG. 10A shows a longitudinal aberration curve of the optical imaging system of embodiment 5, which represents convergence focus deviations of light rays of different wavelengths after passing through the system. FIG. 10B shows an astigmatism curve of the optical imaging system of embodiment 5, which represents a curvature of tangential image surface and a curvature of sagittal image surface. FIG. 10C shows a distortion curve of the optical imaging system of embodiment 5, which represents distortion values in different angles of view. FIG. 10D shows a lateral color curve of the optical imaging system of embodiment 5, which represents deviations of light rays on different image heights of the imaging surface after passing through the system. According to FIG. 10A to FIG. 10D, the optical imaging system provided in embodiment 5 can achieve a good imaging quality.

Embodiment 6

Figure 11:
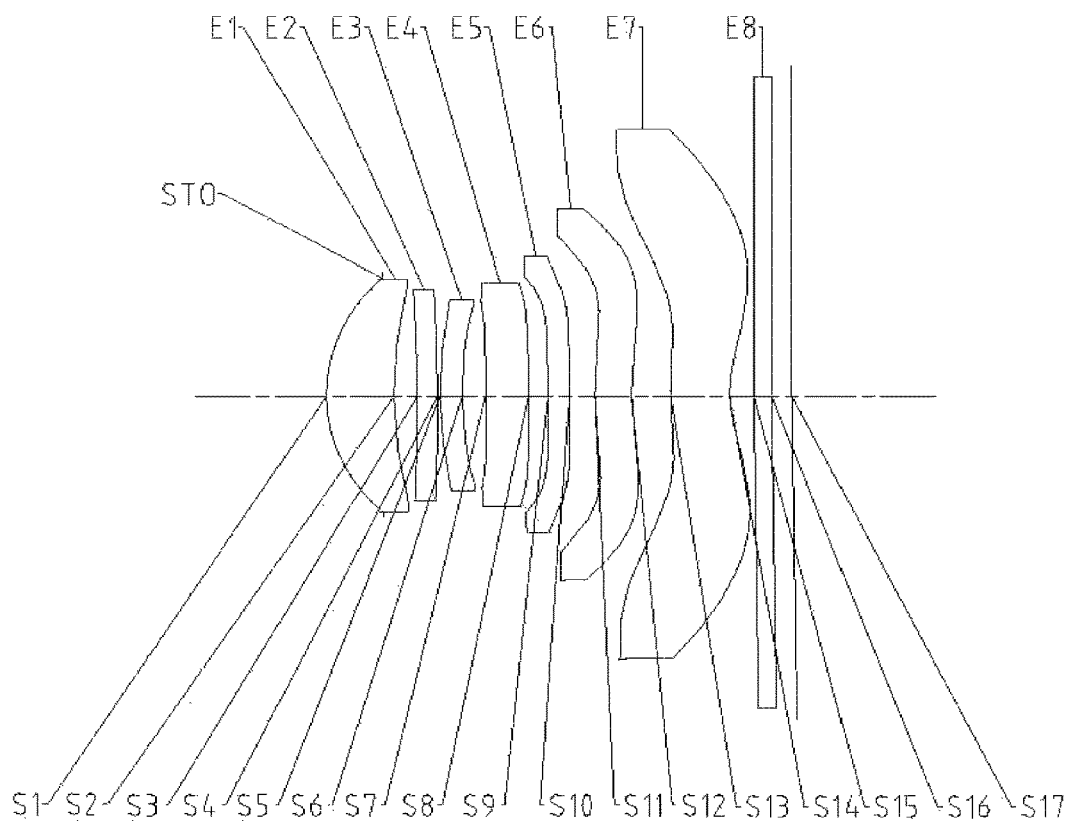
FIG. 11 shows a schematic structural view of an optical imaging system according to embodiment 6 of the disclosure.

An optical imaging system according to embodiment 6 of the disclosure will be described below with reference to FIG. 11 to FIG. 12D. FIG. 11 shows a schematic structural view of an optical imaging system according to embodiment 6 of the disclosure.

As shown in FIG. 11, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 16 shows the surface type, curvature radius, thickness, material and conic coefficient of each lens of the optical imaging system of embodiment 6, wherein the units of the curvature radius and the thickness are both millimeter (mm).

TABLE 16

| Surface number | Surface type | Curvature radius | Thickness | Material Refractive index | Material Abbe number | Conic coefficient |
|---|---|---|---|---|---|---|
| OBJ | Sphere | Infinity | Infinity | | | |
| STO | Sphere | Infinity | −0.6000 | | | |
| S1 | Aspherical surface | 1.8265 | 0.8042 | 1.55 | 56.1 | 0.0155 |
| S2 | Aspherical surface | 5.4446 | 0.2797 | | | −0.4402 |
| S3 | Aspherical surface | −14.7270 | 0.2400 | 1.65 | 23.5 | −97.2456 |
| S4 | Aspherical surface | −21.4247 | 0.0300 | | | 99.0000 |
| S5 | Aspherical surface | 5.4174 | 0.2665 | 1.68 | 19.2 | 16.0816 |
| S6 | Aspherical surface | 5.4845 | 0.2782 | | | 19.9369 |
| S7 | Aspherical surface | −250.0000 | 0.5128 | 1.55 | 56.1 | −99.0000 |
| S8 | Aspherical surface | −71.3899 | 0.2300 | | | 99.0000 |
| S9 | Aspherical surface | 500.0000 | 0.2500 | 1.65 | 23.5 | −99.0000 |
| S10 | Aspherical surface | 87.7968 | 0.3009 | | | 99.0000 |
| S11 | Aspherical surface | 4.1821 | 0.4400 | 1.68 | 19.2 | −99.0000 |
| S12 | Aspherical surface | 4.0395 | 0.4670 | | | −37.4700 |
| S13 | Aspherical surface | 4.2267 | 0.7015 | 1.54 | 55.7 | −0.2643 |
| S14 | Aspherical surface | 1.7667 | 0.2914 | | | −1.6799 |
| S15 | Sphere | Infinity | 0.2100 | 1.52 | 64.2 | |
| S16 | Sphere | Infinity | 0.2435 | | | |
| S17 | Sphere | Infinity | | | | |

As can be determined from Table 16, in embodiment 6, the object-side surface and the image-side surface of any one of the first lens E1 to the seventh lens E7 are all aspherical surfaces. Table 17 shows high-order coefficients which can be used for each aspherical lens surfaces in embodiment 6, wherein each aspherical surface types can be defined by equation (1) given in embodiment 1 above.

TABLE 17

| Surface number | A4 | A6 | A8 | A10 | A12 | A14 | A16 | A18 | A20 |
|---|---|---|---|---|---|---|---|---|---|
| S1 | 1.6394E−04 | −1.0375E−03 | 1.3853E−03 | −1.0991E−03 | 5.2700E−04 | −1.5753E−04 | 2.8583E−05 | −2.8943E−06 | 1.2499E−07 |
| S2 | 1.6905E−16 | −1.5297E−15 | 6.0490E−15 | −1.2074E−14 | 1.2148E−14 | −4.9780E−15 | −7.3090E−16 | 1.2225E−15 | −2.7282E−16 |
| S3 | 0.0000E+00 | −4.9588E−227 | 0.0000E+00 | 0.0000E+00 | 0.0000E+00 | 0.0000E+00 | 0.0000E+00 | 0.0000E+00 | 0.0000E+00 |
| S4 | −2.4172E−04 | 1.2346E−05 | −1.1811E−05 | 1.4279E−05 | −6.8637E−06 | 1.5144E−06 | −1.9266E−07 | 1.3041E−08 | −3.7447E−10 |
| S5 | −2.2143E−02 | −6.4782E−03 | 1.1609E−02 | −2.8713E−02 | 4.0925E−02 | 3.4791E−02 | 1.7448E−02 | −4.7470E−03 | 5.3516E−04 |
| S6 | −1.4787E−02 | 7.2501E−03 | −2.8527E−02 | 6.0710E−02 | −7.6935E−02 | 6.1035E−02 | −2.9076E−02 | 7.6372E−03 | −8.4561E−04 |
| S7 | −2.2153E−02 | 5.1647E−03 | −3.1507E−02 | 4.5490E−02 | −2.9053E−02 | −1.6796E−02 | 4.0068E−02 | −2.4711E−02 | 5.4920E−03 |
| S8 | −2.0362E−02 | −2.4924E−03 | −1.8351E−03 | −1.5313E−03 | 4.7992E−03 | −6.0887E−03 | 3.9023E−03 | −1.2879E−03 | 1.7980E−04 |
| S9 | −3.1346E−02 | 3.8804E−03 | −1.1039E−01 | 2.6733E−01 | −3.4002E−01 | 2.4835E−01 | −1.0552E−01 | 2.4155E−02 | −2.2865E−03 |
| S10 | 4.1307E−03 | −9.1984E−02 | 9.3256E−02 | −5.4938E−02 | 1.7390E−02 | −1.8980E−03 | −3.4836E−04 | 1.1111E−04 | −8.2326E−06 |
| S11 | 5.1501E−02 | −1.1819E−01 | 8.8588E−02 | −4.7507E−02 | 1.5591E−02 | −2.8108E−03 | 2.4016E−04 | −3.8356E−06 | −4.7170E−07 |
| S12 | −1.2633E−02 | −9.2898E−03 | −1.2090E−03 | 1.8794E−03 | −7.5463E−04 | 1.7289E−04 | −2.1599E−05 | 1.2274E−06 | −1.6403E−08 |
| S13 | −1.5475E−01 | 4.4683E−02 | −7.7350E−03 | 9.8925E−04 | −1.0049E−04 | 7.8180E−06 | −4.1950E−07 | 1.3361E−08 | −1.8712E−10 |
| S14 | −1.2590E−01 | 4.3360E−02 | −1.2507E−02 | 2.5599E−03 | −3.4275E−04 | 2.8997E−05 | −1.4861E−06 | 4.2007E−08 | −5.0181E−10 |

Table 18 shows effective focal lengths f1 to f7 of the lenses in embodiment 6, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 18

| f1 (mm) | 4.67 | f7 (mm) | −6.28 |
|---|---|---|---|
| f2 (mm) | −74.13 | f (mm) | 4.79 |
| f3 (mm) | 251.00 | TTL (mm) | 5.55 |
| f4 (mm) | 182.87 | ImgH (mm) | 3.96 |
| f5 (mm) | −165.26 | HFOV (°) | 39.4 |
| f6 (mm) | 710.98 | | |

Figure 12A:
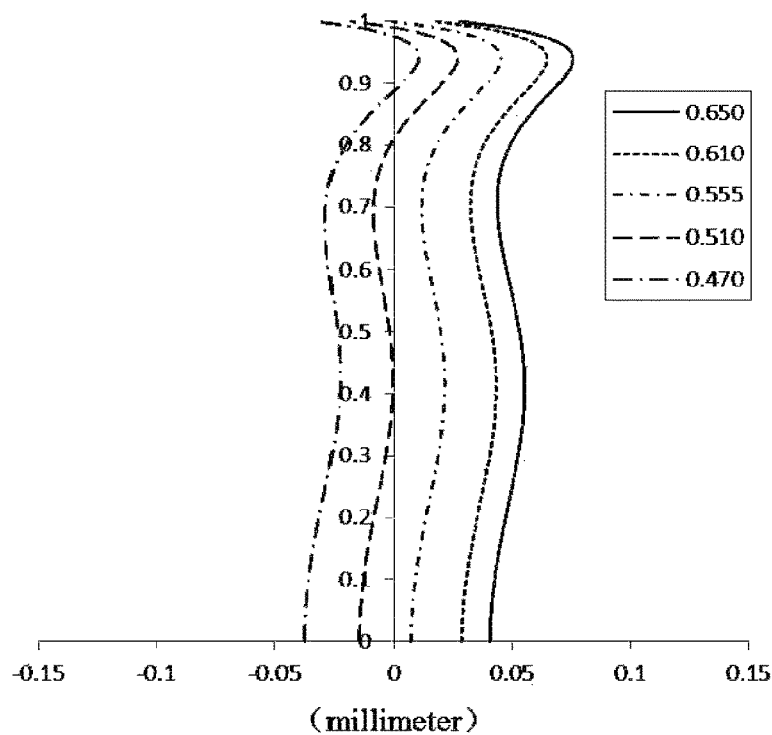
FIG. 12A to FIG. 12D show a longitudinal aberration curve, an astigmatism curve, a distortion curve, and a lateral color curve of the optical imaging system of embodiment 6, respectively.
Figure 12B:
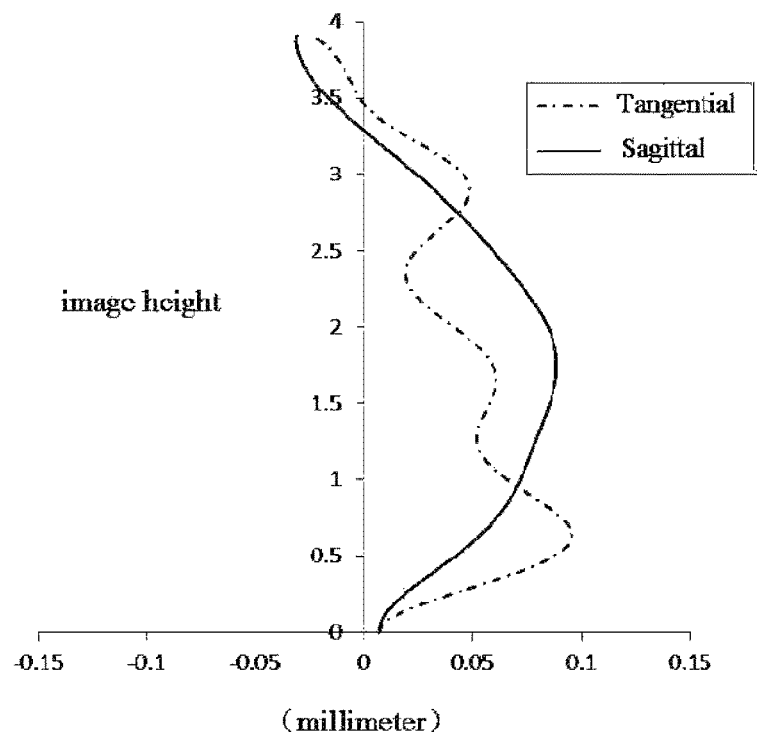
Figure 12C:
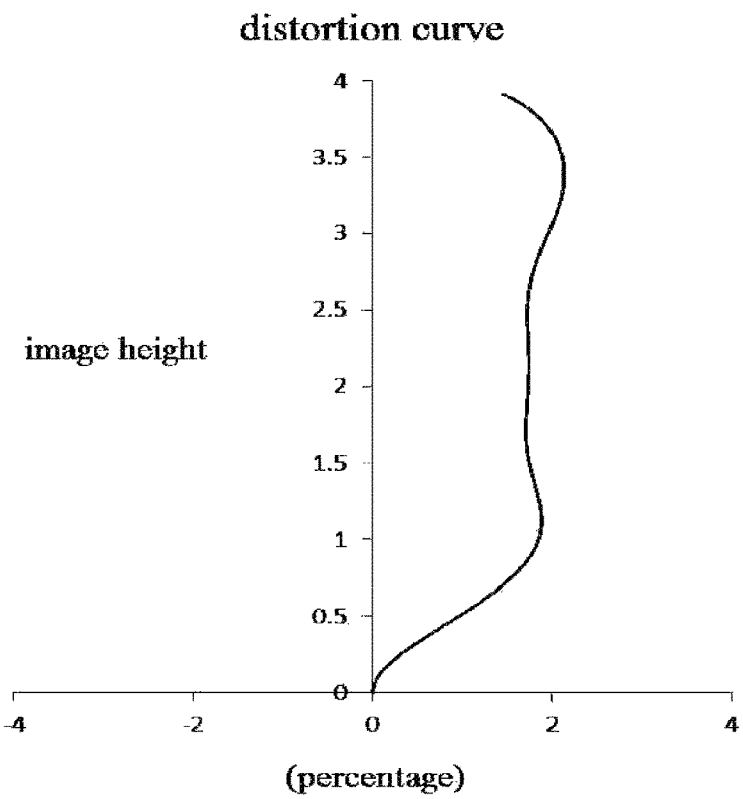
Figure 12D:
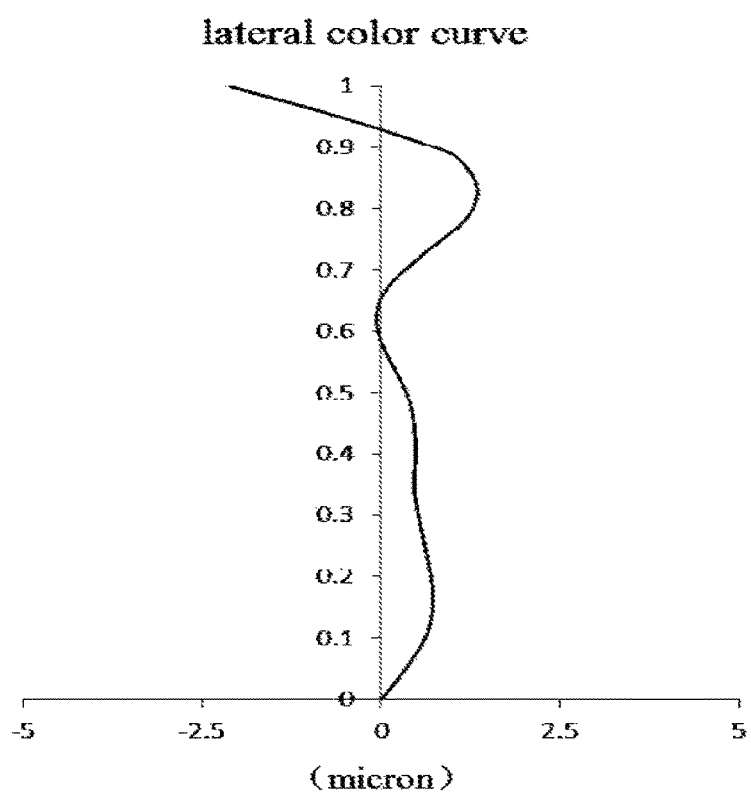

FIG. 12A shows a longitudinal aberration curve of the optical imaging system of embodiment 6, which represents convergence focus deviations of light rays of different wavelengths after passing through the system. FIG. 12B shows an astigmatism curve of the optical imaging system of embodiment 6, which represents a curvature of tangential image surface and a curvature of sagittal image surface. FIG. 12C shows a distortion curve of the optical imaging system of embodiment 6, which represents distortion values corresponding to different image heights. FIG. 12D shows a lateral color curve of the optical imaging system of embodiment 6, which represents deviations of light rays on different image heights of the imaging surface after passing through the system. According to FIG. 12A to FIG. 12D, the optical imaging system provided in embodiment 6 can achieve a good imaging quality.

Embodiment 7

Figure 13:
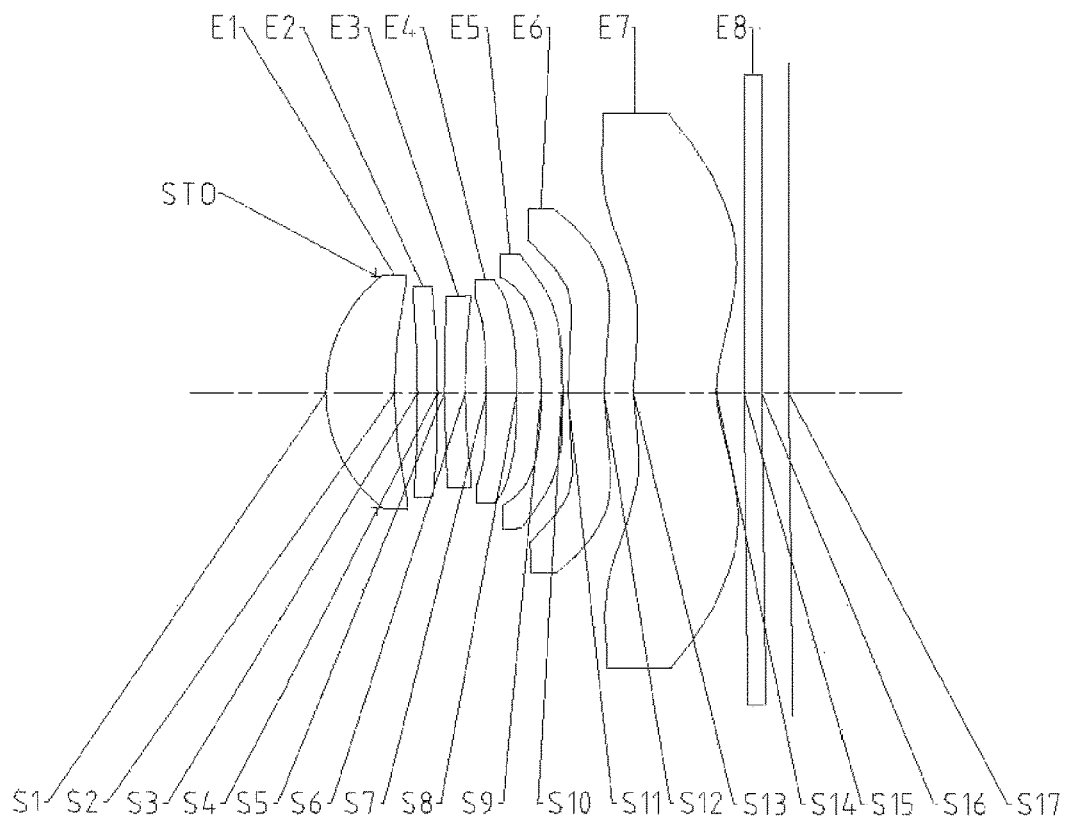
FIG. 13 shows a schematic structural view of an optical imaging system according to embodiment 7 of the disclosure.

An optical imaging system according to embodiment 7 of the disclosure will be described below with reference to FIG. 13 to FIG. 14D. FIG. 13 shows a schematic structural view of an optical imaging system according to embodiment 7 of the disclosure;

As shown in FIG. 13, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 19 shows the surface type, curvature radius, thickness, material and conic coefficient of each lens of the optical imaging system of embodiment 7, wherein the units of the curvature radius and the thickness are both millimeter (mm).

TABLE 19

| Surface number | Surface type | Curvature radius | Thickness | Material | | Conic coefficient |
|---|---|---|---|---|---|---|
| | | | | Refractive index | Abbe number | |
| OBJ | Sphere | Infinity | Infinity | | | |
| STO | Sphere | Infinity | −0.6000 | | | |
| S1 | Aspherical surface | 1.8158 | 0.8214 | 1.55 | 56.1 | 0.0720 |
| S2 | Aspherical surface | 6.1234 | 0.2800 | | | 2.5413 |
| S3 | Aspherical surface | −12.2035 | 0.2400 | 1.65 | 23.5 | −84.3171 |
| S4 | Aspherical surface | −15.2562 | 0.0817 | | | 51.1906 |
| S5 | Aspherical surface | 10.2908 | 0.2500 | 1.68 | 19.2 | 62.0346 |
| S6 | Aspherical surface | 10.0000 | 0.2545 | | | 66.3069 |

TABLE 19-continued

| Surface number | Surface type | Curvature radius | Thickness | Material Refractive index | Material Abbe number | Conic coefficient |
|---|---|---|---|---|---|---|
| S7 | Aspherical surface | −11.1477 | 0.3635 | 1.55 | 56.1 | 84.2257 |
| S8 | Aspherical surface | −8.7791 | 0.2946 | | | 21.9359 |
| S9 | Aspherical surface | −6.7462 | 0.2500 | 1.65 | 23.5 | 21.8071 |
| S10 | Aspherical surface | −13.7488 | 0.0613 | | | 61.9237 |
| S11 | Aspherical surface | 4.1259 | 0.4320 | 1.68 | 19.2 | −99.0000 |
| S12 | Aspherical surface | 3.9855 | 0.3541 | | | −41.1441 |
| S13 | Aspherical surface | 3.0000 | 0.9929 | 1.54 | 55.7 | −1.0276 |
| S14 | Aspherical surface | 1.8186 | 0.3324 | | | −1.4158 |
| S15 | Sphere | Infinity | 0.2100 | 1.52 | 64.2 | |
| S16 | Sphere | Infinity | 0.3275 | | | |
| S17 | Sphere | Infinity | | | | |

As can be determined from Table 19, in embodiment 7, the object-side surface and the image-side surface of any one of the first lens E1 to the seventh lens E7 are all aspherical surfaces. Table 20 shows high-order coefficients which can be used for each aspherical lens surfaces in embodiment 7, wherein each aspherical surface types can be defined by equation (1) given in embodiment 1 above.

TABLE 20

| Surface number | A4 | A6 | A8 | A10 | A12 | A14 | A16 | A18 | A20 |
|---|---|---|---|---|---|---|---|---|---|
| S1 | 4.3845E−13 | 4.7695E−15 | −3.3248E−14 | 9.0904E−14 | −1.3346E−13 | 1.1476E−13 | −5.8031E−14 | 1.6000E−14 | −1.8566E−15 |
| S2 | −1.4683E−16 | 4.1693E−15 | −3.1166E−14 | 1.0291E−13 | −1.8224E−13 | 1.8608E−13 | −1.0990E−13 | 3.4909E−14 | −4.6178E−15 |
| S3 | 0.0000E+00 | −3.0524E−225 | 0.0000E+00 | 0.0000E+00 | 0.0000E+00 | 0.0000E+00 | 0.0000E+00 | 0.0000E+00 | 0.0000E+00 |
| S4 | −2.3843E−03 | 3.8246E−04 | −1.1492E−03 | 4.3633E−03 | −6.5869E−03 | 4.5644E−03 | −1.8237E−03 | 3.8770E−04 | −3.4965E−05 |
| S5 | 2.8924E−02 | −9.6711E−03 | 1.9807E−02 | −5.5991E−02 | 9.1209E−02 | −8.8617E−02 | 5.0794E−02 | −1.5794E−02 | 2.0350E−03 |
| S6 | −1.5349E−02 | 7.6677E−03 | −3.0739E−02 | 6.6649E−02 | −8.6053E−02 | 6.9555E−02 | −3.3759E−02 | 9.0343E−03 | −1.0192E−03 |
| S7 | −1.8454E−02 | 3.9269E−03 | 2.1865E−02 | 2.8812E−02 | −1.6795E−02 | −8.8619E−03 | 1.9296E−02 | −1.0861E−02 | 2.2032E−03 |
| S8 | −2.8046E−02 | −4.0288E−03 | −3.4813E−03 | 3.4092E−03 | 1.2540E−02 | −1.8671E−02 | 1.4044E−02 | −5.4395E−03 | 8.9125E−04 |
| S9 | −3.1756E−02 | 3.9567E−03 | −1.1330E−01 | 2.7616E−01 | −3.5353E−01 | 2.5990E−01 | −1.1114E−01 | 2.5609E−02 | −2.4399E−03 |
| S10 | 6.4070E−03 | −1.7769E−01 | 2.2436E−01 | −1.6461E−01 | 6.4894E−02 | −8.8210E−03 | −2.0163E−03 | 8.0092E−04 | −7.3909E−05 |
| S11 | 6.5105E−02 | −1.6799E−01 | 1.4157E−01 | −8.5358E−02 | 3.1495E−02 | −6.3842E−03 | 6.1332E−04 | −1.1013E−05 | −1.5228E−06 |
| S12 | 1.3585E−02 | −1.0360E−02 | −1.3981E−03 | 2.2538E−03 | −9.3844E−04 | 2.2295E−04 | −2.8885E−05 | 1.7022E−06 | −2.3589E−08 |
| S13 | −1.5961E−01 | 4.6806E−02 | −8.2289E−03 | 1.0688E−03 | −1.1027E−04 | 8.7123E−06 | −4.7478E−07 | 1.5357E−08 | −2.1844E−10 |
| S14 | −1.1845E−01 | 3.9570E−02 | −1.1071E−02 | 2.1980E−03 | −2.8546E−04 | 2.3424E−05 | −1.1644E−06 | 3.1927E−08 | −3.6995E−10 |

Table 21 shows effective focal lengths f1 to f7 of the lenses in embodiment 7, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 21

| | | | |
|---|---|---|---|
| f1 (mm) | 4.43 | f7 (mm) | −12.18 |
| f2 (mm) | −97.63 | f (mm) | 4.62 |
| f3 (mm) | −800.00 | TTL (mm) | 5.55 |
| f4 (mm) | 71.80 | ImgH (mm) | 3.96 |
| f5 (mm) | −20.84 | HFOV (°) | 40.3 |
| f6 (mm) | 711.00 | | |

Figure 14A:
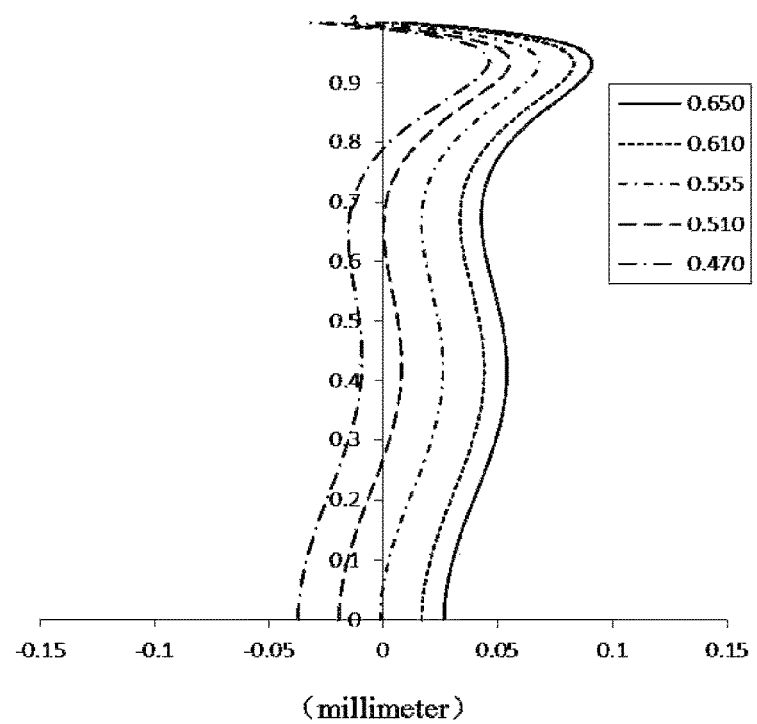
FIG. 14A to FIG. 14D show a longitudinal aberration curve, an astigmatism curve, a distortion curve, and a lateral color curve of the optical imaging system of embodiment 7, respectively.
Figure 14B:
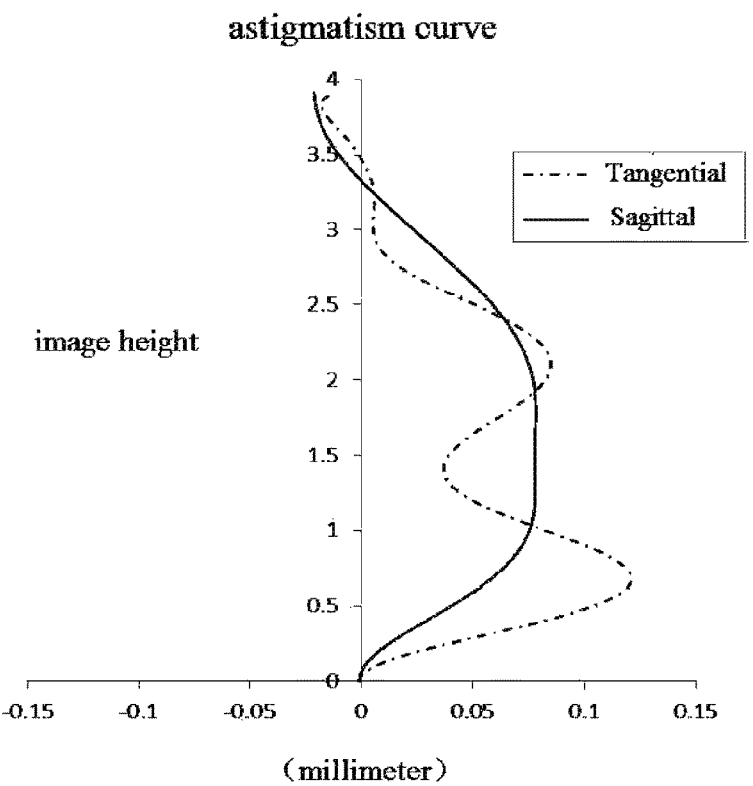
Figure 14C:
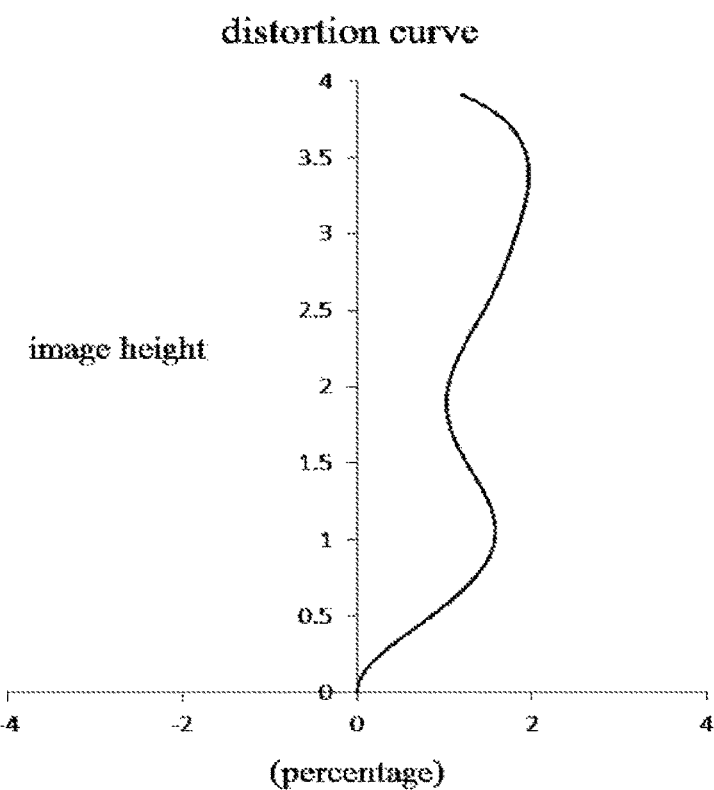
Figure 14D:
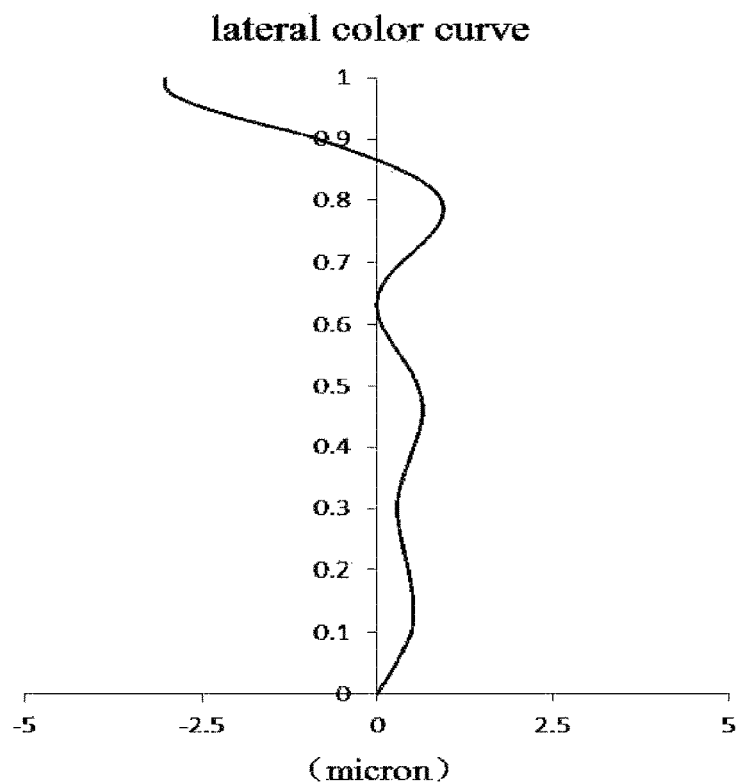

FIG. 14A shows a longitudinal aberration curve of the optical imaging system of embodiment 7, which represents convergence focus deviations of light rays of different wavelengths after passing through the system. FIG. 14B shows an astigmatism curve of the optical imaging system of embodiment 7, which represents a curvature of tangential image surface and a curvature of sagittal image surface. FIG. 14C shows a distortion curve of the optical imaging system of embodiment 7, which represents distortion values corresponding to different image heights. FIG. 14D shows a lateral color curve of the optical imaging system of embodiment 7, which represents deviations of light rays on different image heights of the imaging surface after passing through the system. According to FIG. 14A to FIG. 14D, the optical imaging system provided in embodiment 7 can achieve a good imaging quality.

Embodiment 8

Figure 15:
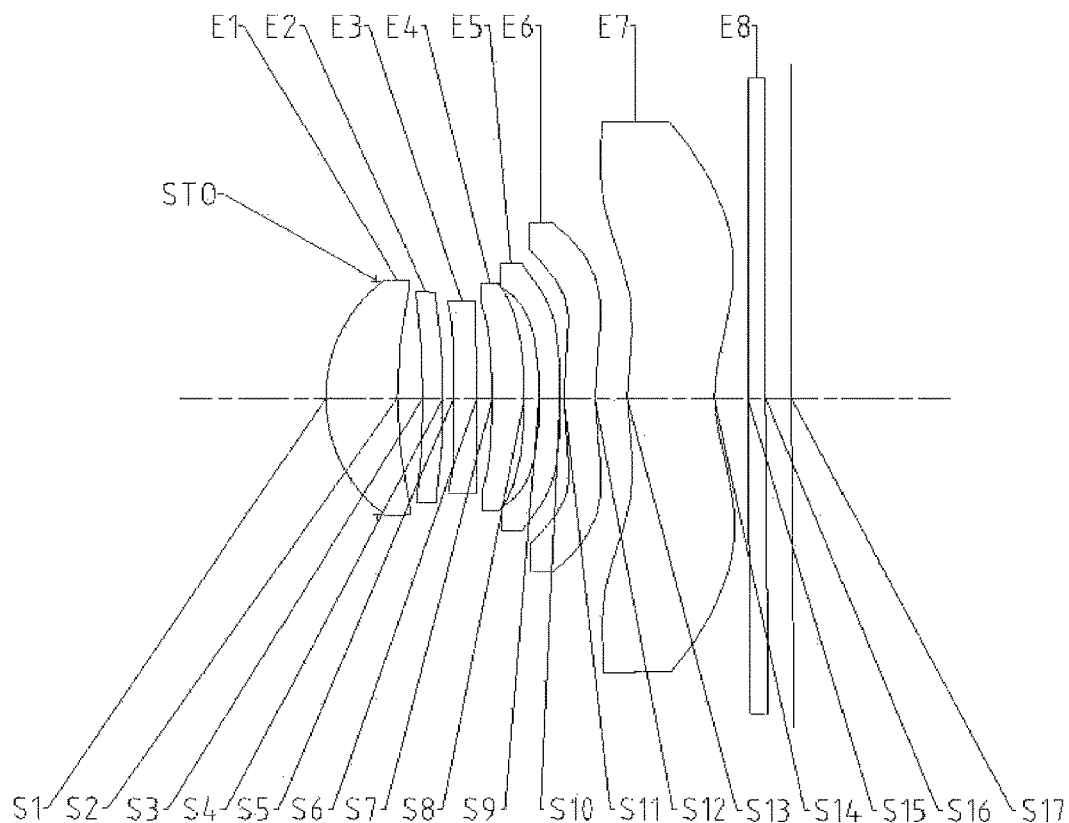
FIG. 15 shows a schematic structural view of an optical imaging system according to embodiment 8 of the disclosure.

An optical imaging system according to embodiment 8 of the disclosure will be described below with reference to FIGS. 15 to 16D. FIG. 15 shows a schematic structural view of an optical imaging system according to embodiment 8 of the disclosure.

As shown in FIG. 15, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a negative refractive power, an object-side surface S5 thereof is a concave surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 22 shows the surface type, curvature radius, thickness, material and conic coefficient of each lens of the optical imaging system of embodiment 8, wherein the units of the curvature radius and the thickness are both millimeter (mm).

TABLE 22

| Surface number | Surface type | Curvature radius | Thickness | Material Refractive index | Abbe number | Conic coefficient |
|---|---|---|---|---|---|---|
| OBJ | Sphere | Infinity | Infinity | | | |
| STO | Sphere | Infinity | −0.6000 | | | |
| S1 | Aspherical surface | 1.7986 | 0.8517 | 1.55 | 56.1 | 0.1005 |
| S2 | Aspherical surface | 6.2362 | 0.3059 | | | 1.7799 |
| S3 | Aspherical surface | −8.5343 | 0.2400 | 1.65 | 23.5 | −27.9661 |
| S4 | Aspherical surface | −8.7441 | 0.1285 | | | −18.1241 |
| S5 | Aspherical surface | −250.0000 | 0.2779 | 1.68 | 19.2 | 99.0000 |
| S6 | Aspherical surface | 270.3972 | 0.1822 | | | −99.0000 |
| S7 | Aspherical surface | −7.0091 | 0.3810 | 1.55 | 56.1 | 31.6742 |
| S8 | Aspherical surface | −5.8013 | 0.1768 | | | 8.6178 |
| S9 | Aspherical surface | −5.9914 | 0.2500 | 1.65 | 23.5 | 18.8203 |
| S10 | Aspherical surface | −14.0975 | 0.0392 | | | 69.3020 |
| S11 | Aspherical surface | 3.3595 | 0.3676 | 1.68 | 19.2 | −97.8824 |
| S12 | Aspherical surface | 3.2336 | 0.3824 | | | −44.6148 |
| S13 | Aspherical surface | 2.8352 | 1.0398 | 1.54 | 55.7 | −1.1652 |
| S14 | Aspherical surface | 1.9031 | 0.4023 | | | −1.4698 |
| S15 | Sphere | Infinity | 0.2100 | 1.52 | 64.2 | |
| S16 | Sphere | Infinity | 0.3107 | | | |
| S17 | Sphere | Infinity | | | | |

As can be determined from Table 22, in embodiment 8, the object-side surface and the image-side surface of any one of the first lens E1 to the seventh lens E7 are all aspherical surfaces. Table 23 shows high-order coefficients which can be used for each aspherical lens surfaces in embodiment 8, wherein each aspherical surface types can be defined by equation (1) given in embodiment 1 above.

TABLE 23

| Surface number | A4 | A6 | A8 | A10 | A12 | A14 | A16 | A18 | A20 |
|---|---|---|---|---|---|---|---|---|---|
| S1 | 8.2699E−17 | −2.3730E−15 | 1.8465E−14 | −5.4063E−14 | 8.2695E−14 | −7.2615E−14 | 3.6946E−14 | −1.0145E−14 | 1.1643E−15 |
| S2 | 2.0720E−15 | −2.4688E−14 | 1.1888E−13 | −3.0551E−13 | 4.6256E−13 | −4.2589E−13 | 2.3440E−13 | −7.0882E−14 | 9.0582E−15 |
| S3 | 0.0000E+00 | −7.5150E−226 | 0.0000E+00 | 10.0000E+00 | 0.0000E+00 | 0.0000E+00 | 0.0000E+00 | 0.0000E+00 | 0.0000E+00 |
| S4 | −3.2756E−03 | 6.1588E−04 | −2.1690E−03 | 9.6532E−03 | −1.7081E−02 | 1.3873E−02 | −6.4971E−03 | 1.6190E−03 | −1.7113E−04 |
| S5 | −3.0348E−02 | −1.0394E−02 | 2.1806E−02 | −6.3141E−02 | 1.0536E−01 | −1.0485E−01 | 6.1562E−02 | −1.9608E−02 | 2.5878E−03 |
| S6 | −1.9050E−02 | 1.0601E−02 | −4.7347E−02 | 1.1436E−01 | −1.6450E−01 | 1.4812E−01 | −8.0092E−02 | 2.3878E−02 | −3.0008E−03 |
| S7 | −5.8151E−14 | 9.5564E−13 | −6.0880E−12 | 2.0354E−11 | −3.9756E−11 | 4.6978E−11 | −3.3063E−11 | 1.2753E−11 | −2.0749E−12 |
| S8 | −2.2304E−02 | −2.8572E−03 | −2.2017E−03 | −1.9228E−03 | 6.3071E−03 | −8.3745E−03 | 5.6175E−03 | −1.9403E−03 | 2.8351E−04 |
| S9 | −3.5208E−02 | 4.6191E−03 | −1.3927E−01 | 3.5743E−01 | −4.8181E−01 | 3.7296E−01 | −1.6794E−01 | 4.0744E−02 | −4.0874E−03 |
| S10 | 6.3078E−03 | −1.7358E−01 | 2.1746E−01 | −1.5831E−01 | 6.1926E−02 | −8.3522E−03 | −1.8943E−03 | 7.4662E−04 | −6.8362E−05 |
| S11 | 6.6722E−02 | −1.7429E−01 | 1.4869E−01 | −9.0758E−02 | 3.3901E−02 | −6.9567E−03 | 6.7656E−04 | −1.2299E−05 | −1.7215E−06 |
| S12 | −1.4726E−02 | −1.1691E−02 | −1.6426E−03 | 2.7569E−03 | −1.1951E−03 | 2.9561E−04 | −3.9873E−05 | 2.4463E−06 | −3.5295E−08 |
| S13 | −1.5313E−01 | 4.3986E−02 | −7.5747E−03 | 9.6369E−04 | −9.7385E−05 | 7.5367E−06 | −4.0229E−07 | 1.2746E−08 | −1.7758E−10 |
| S14 | 1.1052E−01 | 3.5663E−02 | −9.6385E−03 | 1.8484E−03 | −2.3188E−04 | 1.8380E−05 | −8.8255E−07 | 2.3374E−08 | −2.6162E−10 |

Table 24 shows effective focal lengths f1 to f7 of the lenses in embodiment 8, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 24

| f1 (mm) | 4.34    | f7 (mm)   | −17.67 |
|---------|---------|-----------|--------|
| f2 (mm) | −1000.00| f (mm)    | 4.49   |
| f3 (mm) | −191.67 | TTL (mm)  | 5.55   |
| f4 (mm) | 55.49   | ImgH (mm) | 3.96   |
| f5 (mm) | −16.36  | HFOV (°)  | 41.0   |
| f6 (mm) | 711.00  |           |        |

Figure 16A:
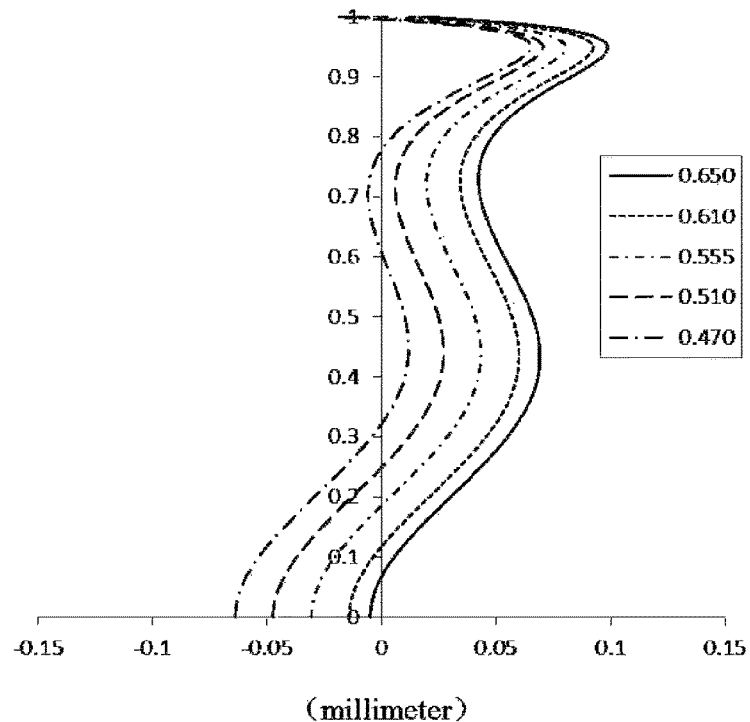
FIG. 16A to FIG. 16D show a longitudinal aberration curve, an astigmatism curve, a distortion curve, and a lateral color curve of the optical imaging system of embodiment 8, respectively.
Figure 16B:
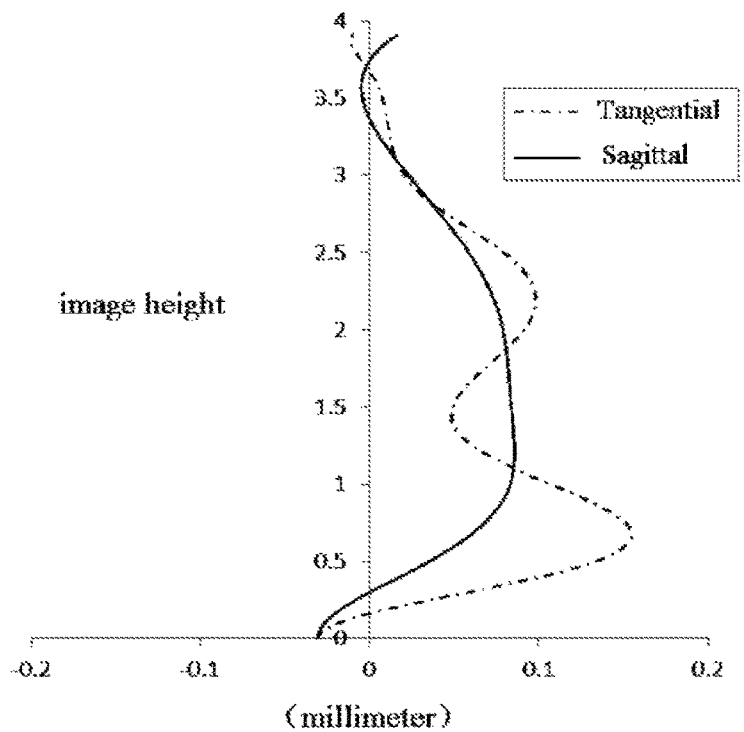
Figure 16C:
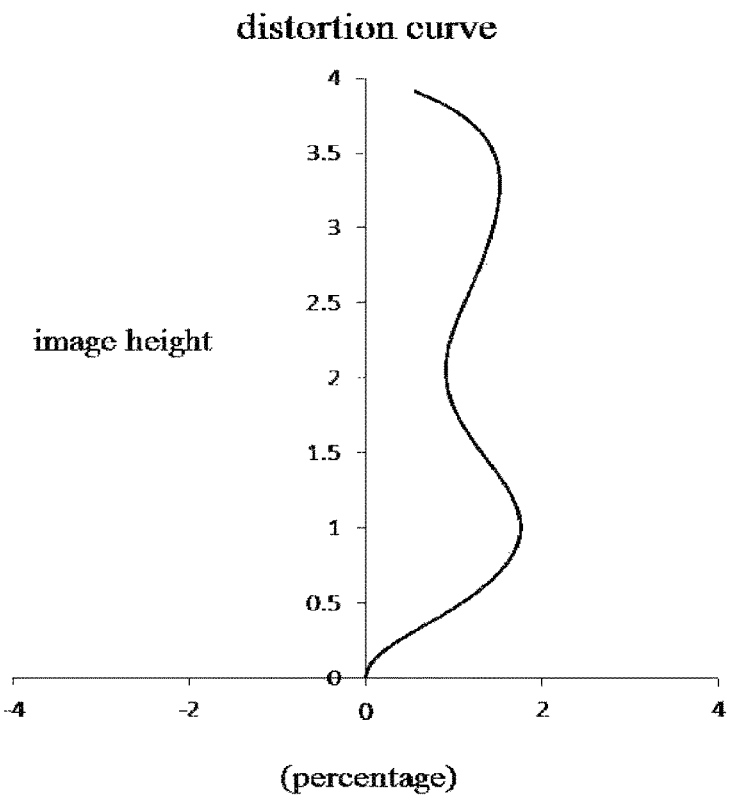
Figure 16D:
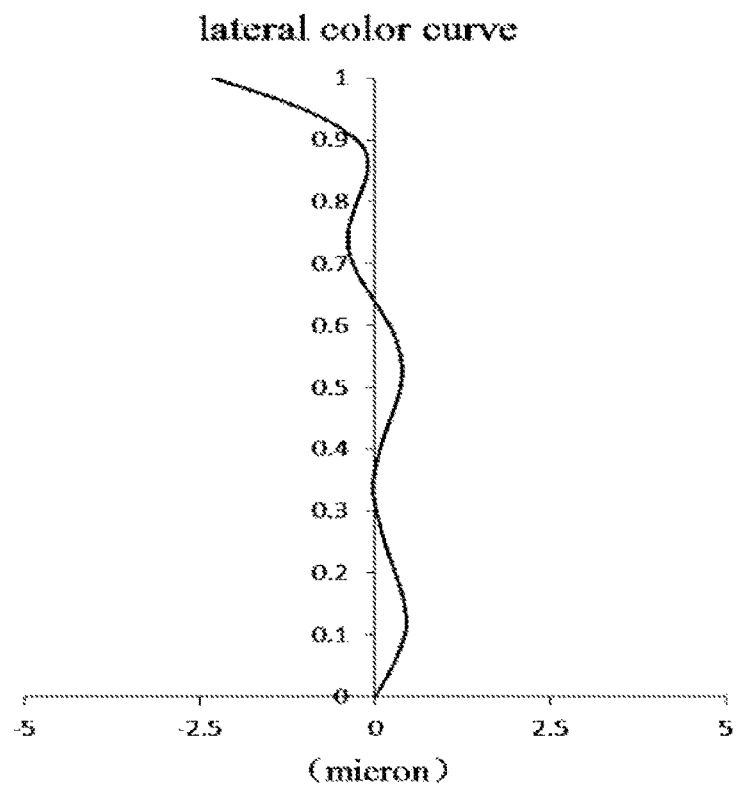

FIG. 16A shows a longitudinal aberration curve of the optical imaging system of embodiment 8, which represents convergence focus deviations of light rays of different wavelengths after passing through the system. FIG. 16B shows an astigmatism curve of the optical imaging system of embodiment 8, which represents a curvature of tangential image surface and a curvature of sagittal image surface. FIG. 16C shows a distortion curve of the optical imaging system of embodiment 8, which represents distortion values corresponding to different image heights. FIG. 16D shows a lateral color curve of the optical imaging system of embodiment 8, which represents deviations of light rays on different image heights of the imaging surface after passing through the system. According to FIG. 16A to FIG. 16D, the optical imaging system provided in embodiment 8 can achieve a good imaging quality.

Embodiment 9

Figure 17:
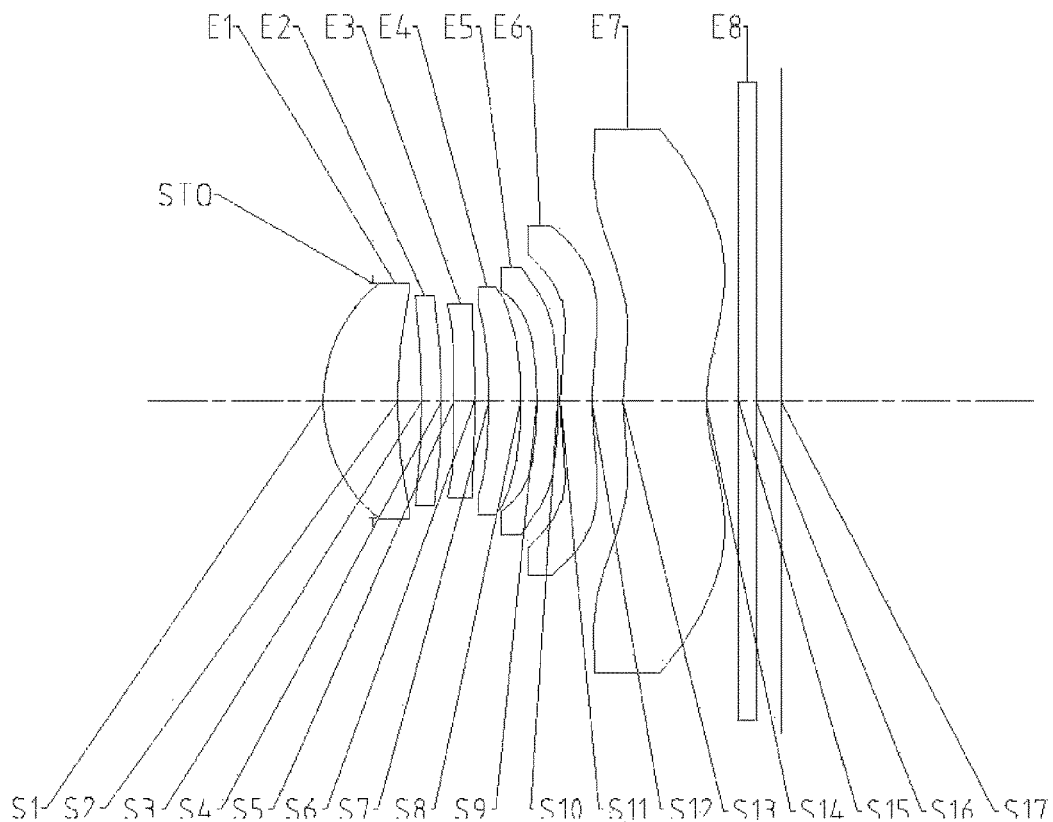
FIG. 17 shows a schematic structural view of an optical imaging system according to embodiment 9 of the disclosure.

An optical imaging system according to Embodiment 9 of the disclosure will be described below with reference to FIG. 17 to FIG. 18D. FIG. 17 shows a schematic structural view of an optical imaging system according to embodiment 9 of the disclosure.

As shown in FIG. 17, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 25 shows the surface type, curvature radius, thickness, material and conic coefficient of each lens of the optical imaging system of embodiment 9, wherein the units of the curvature radius and the thickness are both millimeter (mm).

TABLE 25

| Surface number | Surface type | Curvature radius | Thickness | Material Refractive index | Material Abbe number | Conic coefficient |
|---|---|---|---|---|---|---|
| OBJ | Sphere | Infinity | Infinity | | | |
| STO | Sphere | Infinity | −0.6000 | | | |
| S1 | Aspherical surface | 1.8134 | 0.9009 | 1.55 | 56.1 | 0.0804 |
| S2 | Aspherical surface | 6.2196 | 0.2919 | | | 2.2571 |
| S3 | Aspherical surface | −8.9276 | 0.2400 | 1.65 | 23.5 | −34.9878 |
| S4 | Aspherical surface | −9.1484 | 0.1484 | | | −36.7358 |
| S5 | Aspherical surface | −250.0000 | 0.2535 | 1.68 | 19.2 | 99.0000 |
| S6 | Aspherical surface | −164.2585 | 0.1766 | | | 99.0000 |
| S7 | Aspherical surface | −6.8508 | 0.3812 | 1.55 | 56.1 | 28.8101 |
| S8 | Aspherical surface | −5.7949 | 0.1994 | | | 8.8084 |
| S9 | Aspherical surface | −5.9998 | 0.2500 | 1.65 | 23.5 | 18.6587 |
| S10 | Aspherical surface | −14.1966 | 0.0300 | | | 68.2823 |
| S11 | Aspherical surface | 3.4095 | 0.3764 | 1.68 | 19.2 | −99.0000 |
| S12 | Aspherical surface | 3.2807 | 0.3790 | | | −43.4492 |
| S13 | Aspherical surface | 2.9143 | 1.0096 | 1.54 | 55.7 | −1.0964 |
| S14 | Aspherical surface | 1.8687 | 0.3953 | | | −1.4467 |
| S15 | Sphere | Infinity | 0.2100 | 1.52 | 64.2 | |
| S16 | Sphere | Infinity | 0.3037 | | | |
| S17 | Sphere | Infinity | | | | |

As can be determined from Table 25, in embodiment 9, the object-side surface and the image-side surface of any one of the first lens E1 to the seventh lens E7 are all aspherical surfaces. Table 26 shows high-order coefficients which can be used for each aspherical lens surfaces in embodiment 9, wherein each aspherical surface types can be defined by equation (1) given in embodiment 1 above.

TABLE 26

| Surface number | A4 | A6 | A8 | A10 | A12 | A14 | A16 | A18 | A20 |
|---|---|---|---|---|---|---|---|---|---|
| S1 | 4.6939E−15 | −5.3464E−14 | 2.3407E−13 | −5.3422E−13 | 7.0981E−13 | −5.6983E−13 | 2.7250E−13 | −7.1477E−14 | 7.9168E−15 |
| S2 | −8.5454E−16 | 1.2468E−14 | −7.1996E−14 | 2.1035E−13 | −3.4728E−13 | 3.3899E−13 | −1.9415E−13 | 6.0338E−14 | −7.8569E−15 |
| S3 | 0.0000E+00 | 1.8495E−225 | 0.0000E+00 | 0.0000E+00 | 0.0000E+00 | 0.0000E+00 | 0.0000E+00 | 0.0000E+00 | 0.0000E+00 |
| S4 | −3.2650E−03 | 6.1290E−04 | −2.1550E−03 | 9.5752E−03 | −1.6916E−02 | 1.3717E−02 | −6.4134E−03 | 1.5955E−03 | −1.6838E−04 |
| S5 | −2.9704E−02 | −1.0065E−02 | 2.0890E−02 | −5.9841E−02 | 9.8785E−02 | −9.7263E−02 | 5.6496E−02 | −1.7802E−02 | 2.3244E−03 |
| S6 | −2.0694E−02 | 1.2004E−02 | −5.5875E−02 | 1.4067E−01 | −2.1089E−01 | 1.9792E−01 | −1.1154E−01 | 3.4660E−02 | −4.5399E−03 |
| S7 | −3.0672E−14 | 3.0830E−13 | −1.2836E−12 | 2.9849E−12 | 4.3688E−12 | 4.2054E−12 | −2.6070E−12 | 9.3965E−13 | −1.4809E−13 |
| S8 | −2.1772E−02 | −2.7556E−03 | −2.0979E−03 | −1.8102E−03 | 5.8665E−03 | −7.6960E−03 | 5.1004E−03 | −1.7405E−03 | 2.5127E−04 |
| S9 | −3.4786E−02 | 4.5365E−03 | −1.3595E−01 | 3.4683E−01 | −4.6471E−01 | 3.5757E−01 | −1.6004E−01 | 3.8595E−02 | −3.8486E−03 |
| S10 | 6.1751E−03 | −1.6813E−01 | 2.0841E−01 | −1.5012E−01 | 5.8099E−02 | −7.7530E−03 | −1.7399E−03 | 6.7847E−04 | −6.1466E−05 |
| S11 | 6.5547E−02 | −1.6971E−01 | 1.4350E−01 | −8.6815E−02 | 3.2141E−02 | −6.5373E−03 | 6.3015E−04 | −1.1354E−05 | −1.5752E−06 |
| S12 | −1.4416E−02 | −1.1324E−02 | −1.5743E−03 | 2.6144E−03 | −1.1214E−03 | 2.7444E−04 | −3.6627E−05 | 2.2234E−06 | −3.1741E−08 |
| S13 | −1.5911E−01 | 4.6588E−02 | −8.1779E−03 | 1.0605E−03 | −1.0924E−04 | 8.6180E−06 | −4.6891E−07 | 1.5144E−08 | −2.1507E−10 |
| S14 | −1.1924E−01 | 3.9964E−02 | −1.1219E−02 | 2.2346E−03 | −2.9117E−04 | 2.3972E−05 | −1.1956E−06 | 3.2890E−08 | −3.8237E−10 |

Table 27 shows effective focal lengths f1 to f7 of the lenses in embodiment 9, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 27

| f1 (mm) | 4.37 | f7 (mm) | −14.64 |
|---|---|---|---|
| f2 (mm) | −1000.00 | f (mm) | 4.52 |
| f3 (mm) | 706.00 | TTL (mm) | 5.55 |
| f4 (mm) | 61.09 | ImgH (mm) | 3.96 |
| f5 (mm) | −16.32 | HFOV (°) | 40.8 |
| f6 (mm) | 711.00 | | |

Figure 18A:
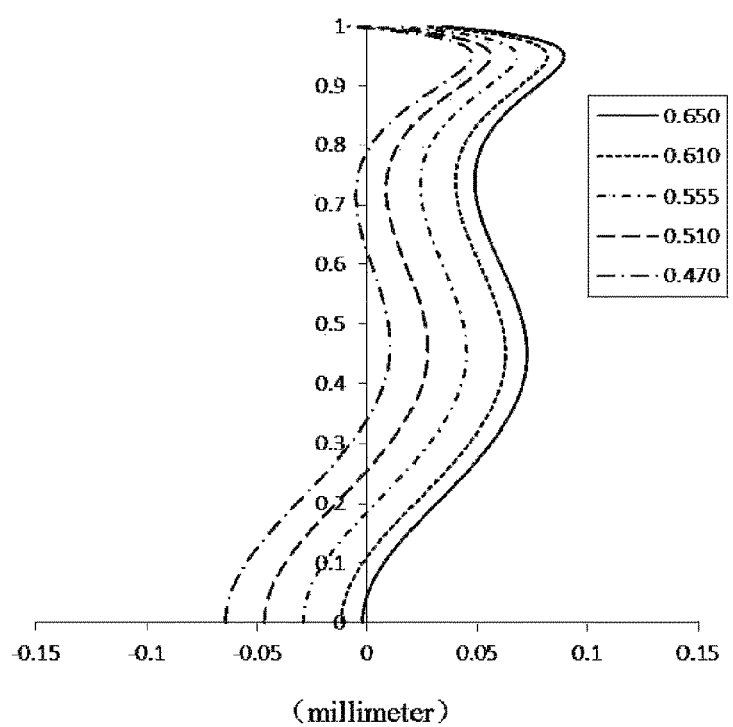
FIG. 18A to FIG. 18D show a longitudinal aberration curve, an astigmatism curve, a distortion curve, and a lateral color curve of the optical imaging system of embodiment 9, respectively.
Figure 18B:
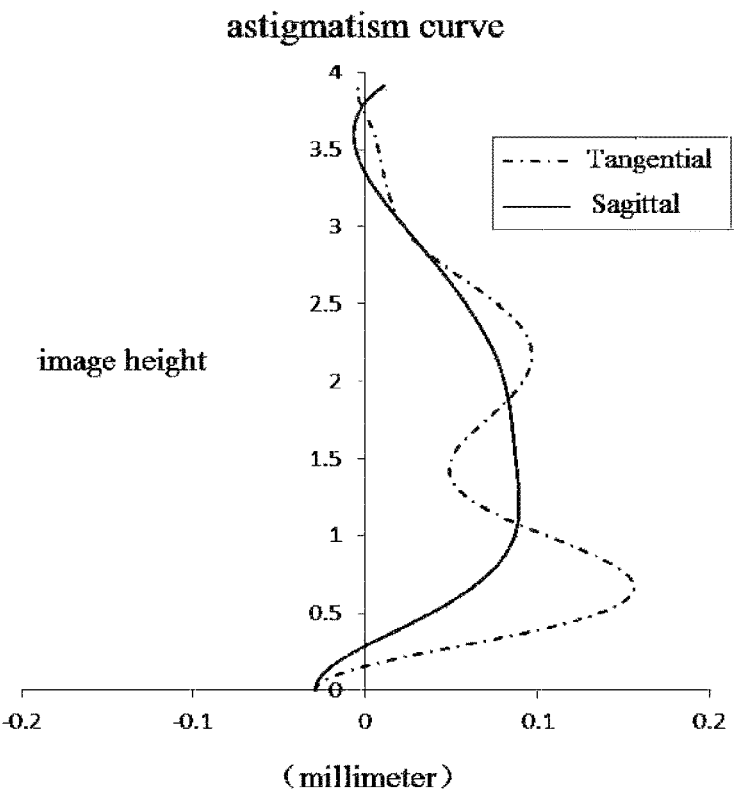
Figure 18C:
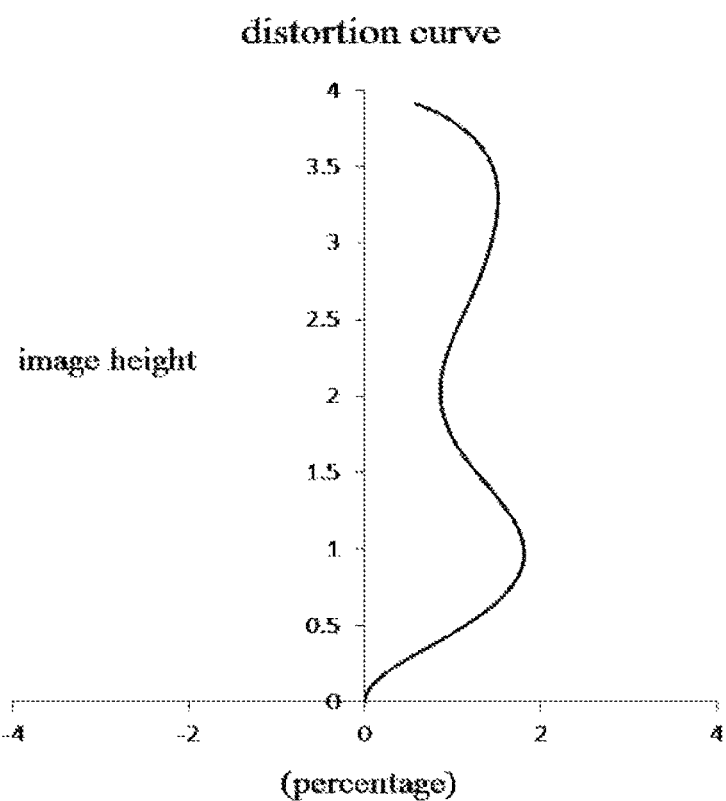
Figure 18D:
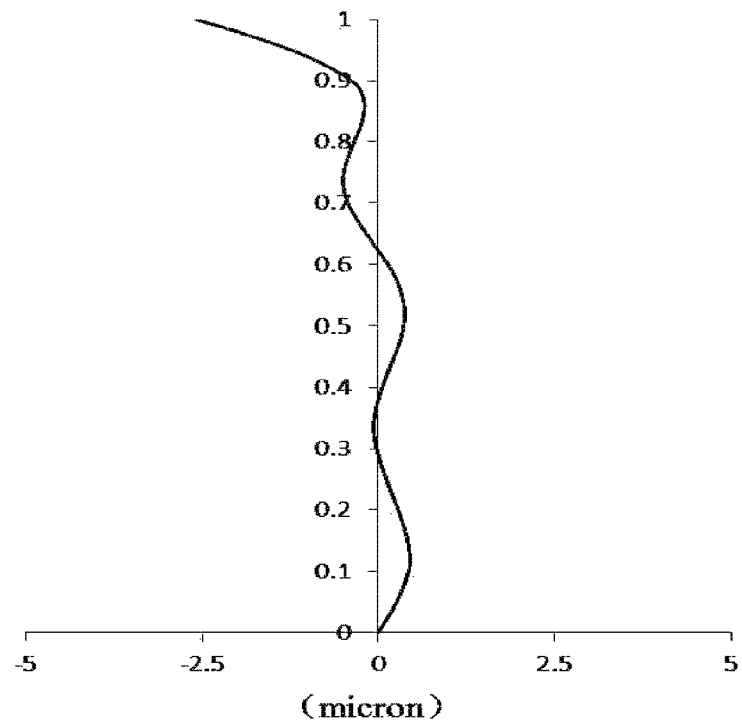

FIG. 18A shows a longitudinal aberration curve of the optical imaging system of embodiment 9, which represents convergence focus deviations of light rays of different wavelengths after passing through the system. FIG. 18B shows an astigmatism curve of the optical imaging system of embodiment 9, which represents a curvature of tangential image surface and a curvature of sagittal image surface. FIG. 18C shows a distortion curve of the optical imaging system of embodiment 9, which represents distortion values corresponding to different image heights. FIG. 18D shows a lateral color curve of the optical imaging system of embodiment 9, which represents deviations of light rays on different image heights of the imaging surface after passing through the system. According to FIG. 18A to FIG. 18D, the optical imaging system provided in embodiment 9 can achieve a good imaging quality.

Embodiment 10

Figure 19:
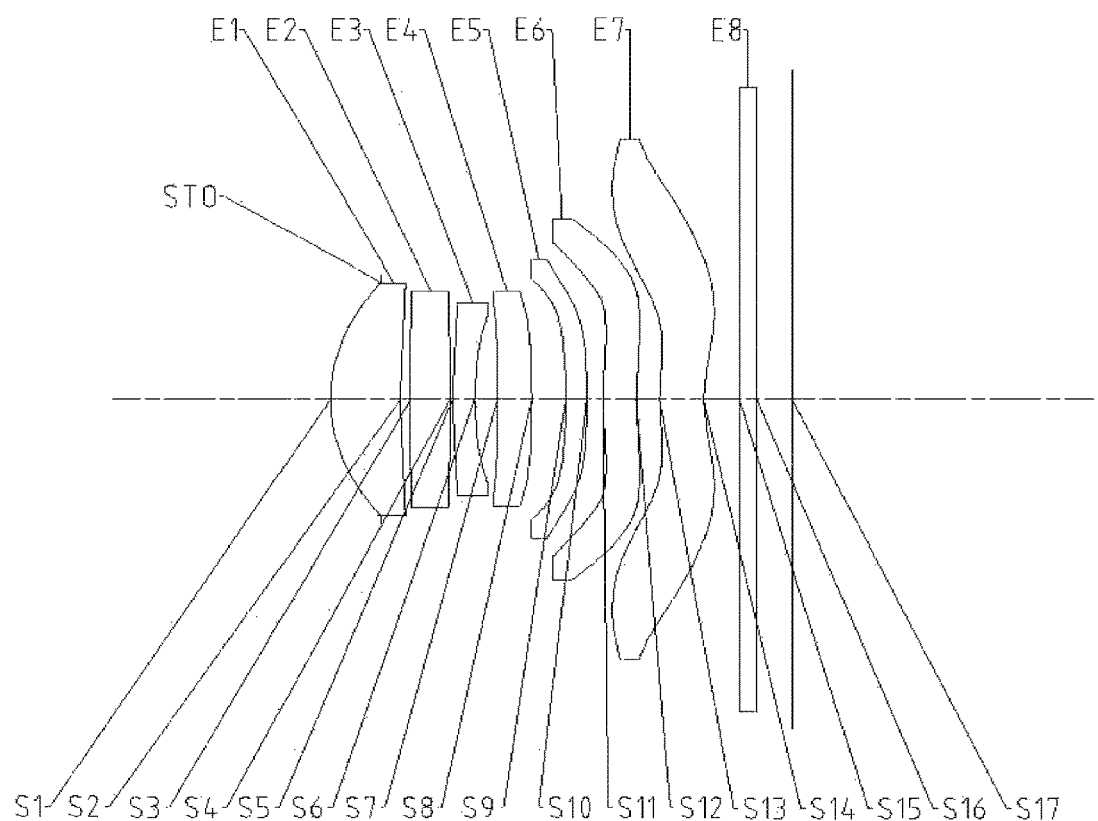
FIG. 19 shows a schematic structural view of an optical imaging system according to embodiment 10 of the disclosure.

An optical imaging system according to embodiment 10 of the disclosure will be described below with reference to FIG. 19 to FIG. 20D. FIG. 19 shows a schematic structural view of an optical imaging system according to embodiment 10 of the disclosure.

As shown in FIG. 19, an optical imaging system according to an exemplary embodiment of the disclosure includes sequentially from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from an object sequentially penetrates through each of the surfaces S1 to S16 and is finally imaged on the imaging surface S17.

Table 28 shows the surface type, curvature radius, thickness, material and conic coefficient of each lens of the optical imaging system of embodiment 10, wherein the units of the curvature radius and the thickness are both millimeter (mm).

TABLE 28

| Surface number | Surface type | Curvature radius | Thickness | Material | | Conic coefficient |
|---|---|---|---|---|---|---|
| | | | | Refractive index | Abbe number | |
| OBJ | Sphere | Infinity | Infinity | | | |
| STO | Sphere | Infinity | −0.6000 | | | |
| S1 | Aspherical surface | 1.8334 | 0.8394 | 1.55 | 56.1 | −0.0864 |
| S2 | Aspherical surface | 9.1060 | 0.1243 | | | −2.7348 |
| S3 | Aspherical surface | −227.4292 | 0.4751 | 1.65 | 23.5 | −99.0000 |
| S4 | Aspherical surface | −333.3333 | 0.0300 | | | −99.0000 |
| S5 | Aspherical surface | 6.5311 | 0.2638 | 1.68 | 19.2 | 24.0841 |
| S6 | Aspherical surface | 3.5307 | 0.2765 | | | 6.4965 |

TABLE 28-continued

| Surface number | Surface type | Curvature radius | Thickness | Material Refractive index | Abbe number | Conic coefficient |
|---|---|---|---|---|---|---|
| S7 | Aspherical surface | −250.0000 | 0.4109 | 1.55 | 56.1 | −99.0000 |
| S8 | Aspherical surface | −15.9478 | 0.4042 | | | −49.3037 |
| S9 | Aspherical surface | −12.3611 | 0.2500 | 1.65 | 23.5 | 53.5911 |
| S10 | Aspherical surface | −12.5187 | 0.1950 | | | −29.9528 |
| S11 | Aspherical surface | 5.4451 | 0.3986 | 1.68 | 19.2 | −80.0890 |
| S12 | Aspherical surface | 4.6398 | 0.2826 | | | −37.8330 |
| S13 | Aspherical surface | 2.7386 | 0.5291 | 1.54 | 55.7 | −0.6964 |
| S14 | Aspherical surface | 1.7110 | 0.4310 | | | −0.9203 |
| S15 | Sphere | Infinity | 0.2100 | 1.52 | 64.2 | |
| S16 | Sphere | Infinity | 0.4252 | | | |
| S17 | Sphere | Infinity | | | | |

As can be determined from Table 28, in embodiment 10, the object-side surface and the image-side surface of any one of the first lens E1 to the seventh lens E7 are all aspherical surfaces. Table 29 shows high-order coefficients which can be used for each aspherical lens surfaces in embodiment 10, wherein each aspherical surface types can be defined by equation (1) given in embodiment 1 above.

TABLE 29

| Surface number | A4 | A6 | A8 | A10 | A12 | A14 | A16 | A18 | A20 |
|---|---|---|---|---|---|---|---|---|---|
| S1 | 9.8884E−04 | −1.5369E−02 | 5.0401E−02 | −9.8207E−02 | 1.1565E−01 | −8.4899E−02 | 3.7834E−02 | −9.4086E−03 | 9.9788E−04 |
| S2 | −1.8075E−02 | 4.6402E−04 | −2.4011E−03 | 2.3049E−02 | −3.5691E−02 | 2.6479E−02 | −1.0432E−02 | 1.9486E−03 | −9.7653E−05 |
| S3 | −8.6467E−03 | 3.3842E−04 | 1.7016E−02 | −2.4636E−02 | 3.0880E−02 | −2.8864E−02 | 1.6894E−02 | −5.3875E−03 | 7.2382E−04 |
| S4 | −2.7162E−03 | 4.6506E−04 | −1.4914E−03 | 6.0444E−03 | −9.7393E−03 | 7.2034E−03 | −3.0719E−03 | 6.9704E−04 | −6.7097E−05 |
| S5 | −3.5515E−02 | −1.3159E−02 | 2.9864E−02 | −9.3545E−02 | 1.6886E−01 | −1.8179E−01 | 1.1546E−01 | −3.9784E−02 | 5.6801E−03 |
| S6 | −2.3844E−02 | 1.4845E−02 | −7.4175E−02 | 2.0045E−01 | −3.2257E−01 | 3.2496E−01 | −1.9658E−01 | 6.5565E−02 | −9.2185E−03 |
| S7 | −1.8799E−02 | 4.0375E−03 | −2.2690E−02 | 3.0178E−02 | −1.7755E−02 | −9.4554E−03 | 2.0780E−02 | −1.1806E−02 | 2.4170E−03 |
| S8 | −2.1983E−02 | −2.7958E−03 | −2.1388E−03 | −1.8544E−03 | 6.0388E−03 | −7.9603E−03 | 5.3011E−03 | −1.8178E−03 | 2.6369E−04 |
| S9 | −3.1769E−02 | 3.9592E−03 | −1.1339E−01 | 2.7645E−01 | −3.5397E−01 | 2.6028E−01 | −1.1133E−01 | 2.5657E−02 | −2.4450E−03 |
| S10 | 7.0311E−03 | −2.0428E−01 | 2.7020E−01 | −2.0767E−01 | 8.5766E−02 | −1.2213E−02 | −2.9244E−03 | 1.2169E−03 | −1.1764E−04 |
| S11 | 8.0641E−02 | −2.3158E−01 | 2.1720E−01 | −1.4575E−01 | 5.9853E−02 | −1.3503E−02 | 1.4437E−03 | −2.8851E−05 | −4.4399E−06 |
| S12 | −1.8237E−02 | −1.6112E−02 | −2.5193E−03 | 4.7054E−03 | −2.2700E−03 | 6.2484E−04 | −9.3791E−05 | 6.4036E−06 | −1.0282E−07 |
| S13 | −2.9861E−01 | 1.1978E−01 | −2.8803E−02 | 5.1171E−03 | −7.2210E−04 | 7.8037E−05 | −5.8168E−06 | 2.5735E−07 | −5.0069E−09 |
| S14 | −2.5225E−01 | 1.2297E−01 | −5.0208E−02 | 1.4546E−02 | −2.7568E−03 | 3.3012E−04 | −2.3948E−05 | 9.5820E−07 | −1.6203E−08 |

Table 30 shows effective focal lengths f1 to f7 of the lenses in embodiment 10, a total effective focal length f of the optical imaging system, TTL, ImgH and HFOV. TTL is a distance from the object-side surface S1 of the first lens E1 to the imaging surface S17 on the optical axis, ImgH is a half the diagonal length of an effective pixel area on the imaging surface S17, and HFOV is a maximum angle of half field of view of the optical imaging system.

TABLE 30

| f1 (mm) | 4.04 | f7 (mm) | −10.36 |
|---|---|---|---|
| f2 (mm) | −1114.41 | f (mm) | 4.95 |
| f3 (mm) | −11.76 | TTL (mm) | 5.55 |
| f4 (mm) | 31.18 | ImgH (mm) | 3.96 |
| f5 (mm) | −4025.15 | HFOV (°) | 38.6 |
| f6 (mm) | −57.87 | | |

Figure 20A:
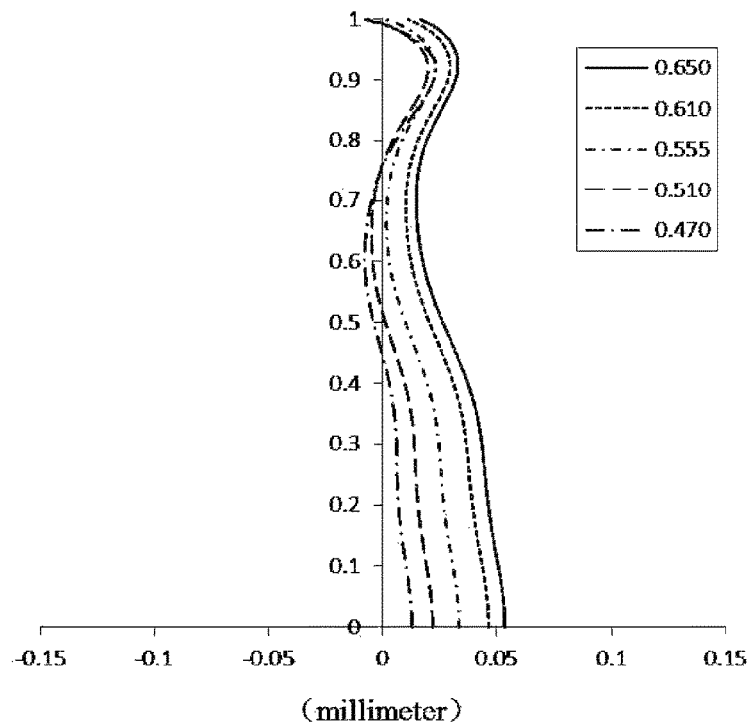
FIG. 20A to FIG. 20D show a longitudinal aberration curve, an astigmatism curve, a distortion curve, and a lateral color curve of the optical imaging system of embodiment 10, respectively.
Figure 20B:
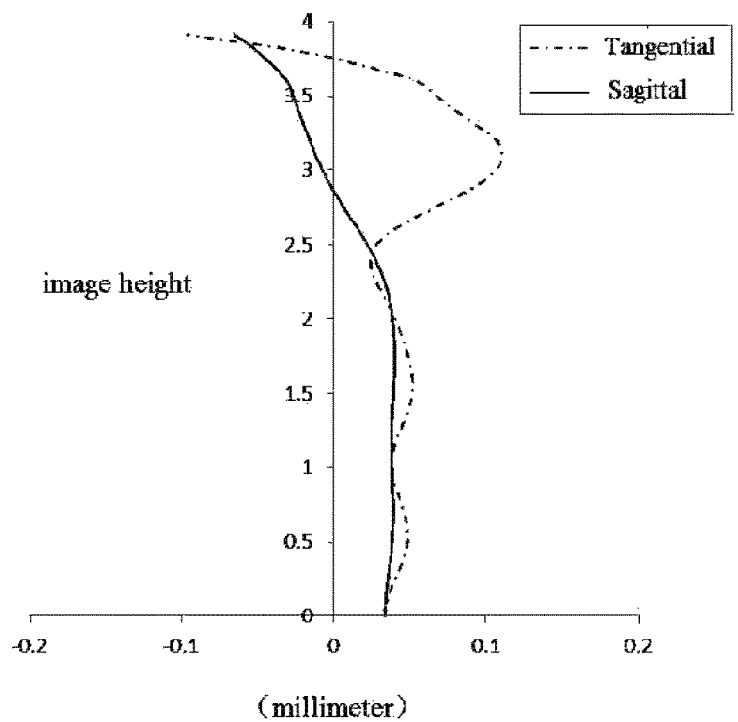
Figure 20C:
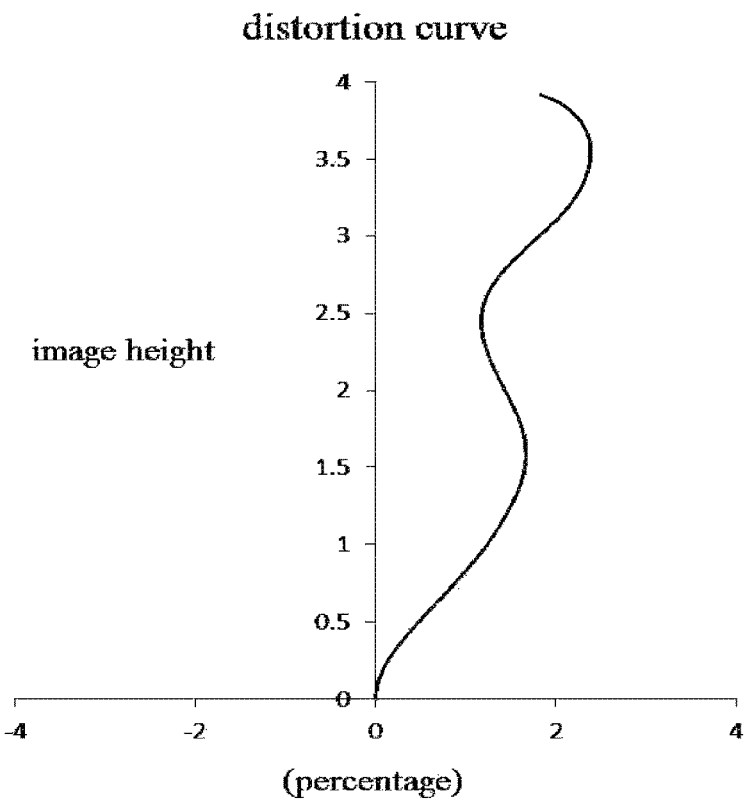
Figure 20D:
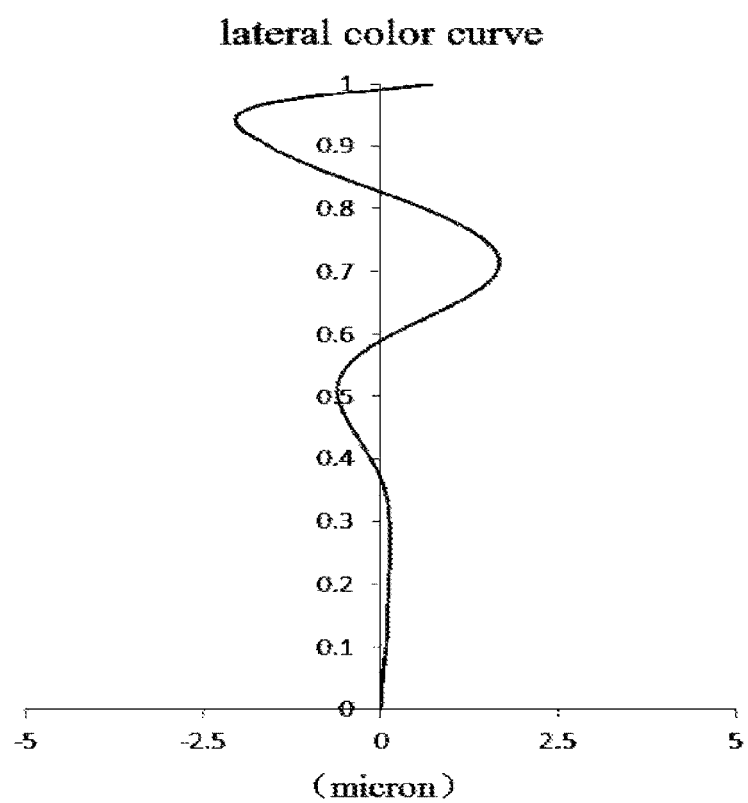

FIG. 20A shows a longitudinal aberration curve of the optical imaging system of embodiment 10, which represents convergence focus deviations of light rays of different wavelengths after passing through the system. FIG. 20B shows an astigmatism curve of the optical imaging system of embodiment 10, which represents a curvature of tangential image surface and a curvature of sagittal image surface. FIG. 20C shows a distortion curve of the optical imaging system of embodiment 10, which represents distortion values corresponding to different image heights. FIG. 20D shows a lateral color curve of the optical imaging system of embodiment 10, which represents deviations of light rays on different image heights of the imaging surface after passing through the system. According to FIG. 20A to FIG. 20D, the optical imaging system provided in embodiment 10 can achieve a good imaging quality.

In summary embodiment 1 to embodiment 10 satisfy the relationships shown in Table 31, respectively.

TABLE 31

| Conditional expression/Embodiment | 1 | 2 | 3 | 4 | 5 | 6 | 7 | 8 | 9 | 10 |
|---|---|---|---|---|---|---|---|---|---|---|
| f*tan(HFOV) (mm) | 3.94 | 3.94 | 3.94 | 3.93 | 3.93 | 3.93 | 3.92 | 3.90 | 3.91 | 3.95 |
| f/f1 | 1.20 | 1.09 | 1.11 | 1.11 | 1.13 | 1.02 | 1.04 | 1.03 | 1.03 | 1.22 |
| f/f7 | −0.45 | −0.34 | −0.35 | −0.49 | −0.45 | −0.76 | −0.38 | −0.25 | −0.31 | −0.48 |
| R2/(R1*2) | 2.25 | 1.77 | 1.98 | 1.81 | 1.86 | 1.49 | 1.69 | 1.73 | 1.71 | 2.48 |
| (R13 + R14)/(R11 + R12) | 0.38 | 0.65 | 0.66 | 0.55 | 0.60 | 0.73 | 0.59 | 0.72 | 0.71 | 0.44 |
| CT1/(CT2 + CT3 + CT4) | 0.77 | 0.80 | 0.87 | 0.90 | 0.99 | 0.79 | 0.96 | 0.95 | 1.03 | 0.73 |
| T23/CT3 | 0.21 | 0.34 | 0.30 | 0.37 | 0.33 | 0.11 | 0.33 | 0.46 | 0.59 | 0.11 |
| f34/f56 | 0.77 | −4.62 | −2.47 | 0.91 | −1.21 | −0.53 | −3.87 | −4.82 | −3.53 | 0.34 |
| ΣCT/TTL | 0.58 | 0.60 | 0.61 | 0.54 | 0.55 | 0.58 | 0.60 | 0.61 | 0.62 | 0.57 |
| f/EPD | 1.77 | 1.72 | 1.70 | 1.73 | 1.73 | 1.70 | 1.65 | 1.60 | 1.61 | 1.76 |

The disclosure also provides an imaging device, wherein the electronic photosensitive element can be a Charge Coupled Device (CCD) or a Complementary Metal Oxide Semiconductor (CMOS). The imaging device may be a stand-alone imaging device, such as a digital camera, or an imaging module integrated on a mobile electronic equipment, such as a cell phone. The imaging device is equipped with the optical imaging system described above.

The above description is only description about the preferred embodiments of the disclosure and adopted technical principles. Those skilled in the art should know that the scope of present disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. An optical imaging system, sequentially comprising from an object side to an image side along, an optical axis: a first lens, a second lens, a third lens, a fourth lens, a fifth lens, a sixth lens, and a seventh lens,
   wherein,
   the first lens has a positive refractive power;
   the second lens has a negative refractive power, a paraxial region of an object-side surface thereof is a concave surface, and a paraxial region of an image-side surface thereof is a convex surface;
   the third lens has a refractive power;
   the fourth lens has a positive refractive power, a paraxial region of an object-side surface thereof is a concave surface, and a paraxial region of an image-side surface thereof is a convex surface;
   the fifth lens has a refractive power;
   the sixth lens has a refractive power;
   the seventh lens has a negative refractive power, and a paraxial region of an object-side surface thereof is a convex surface; and
   a total effective focal length f of the optical imaging system and an entrance pupil diameter EPD of the optical imaging system satisfy f/EPD≤1.8;
   the total effective focal length f of the optical imaging system and a maximum angle of half field of view HFOV of the optical imaging system satisfy 3.9 mm<f*TAN(HFOV)<4.5 mm.

2. The optical imaging system as claimed in claim 1, wherein the total effective focal length f of the optical imaging system and an effective focal length f1 of the first lens satisfy 1≤f/f1<1.5.

3. The optical imaging system as claimed in claim 1, wherein the total effective focal length f of the optical imaging system and an effective focal length f7 of the seventh lens satisfy −1<f/f7<0.

4. The optical imaging system as claimed in claim 2, wherein a curvature radius R2 of an image-side surface of the first lens and a curvature radius R1 of an object-side surface of the first lens satisfy 1<R2/(R1*2)≤2.5.

5. The optical imaging system as claimed in claim 1, wherein a curvature radius R13 of an object-side surface of the seventh lens, a curvature radius R14 of an image-side surface of the seventh lens, a curvature radius R11 of an object-side surface of the sixth lens, and a curvature radius R12 of an image-side surface of the sixth lens satisfy 0.3<(R13+R14)/(R11+R12)<1.

6. The optical imaging system as claimed in claim 1, wherein a center thickness CT1 of the first lens on the optical axis, a center thickness CT2 of the second lens on the optical axis, a center thickness CT3 of the third lens on the optical axis, and a center thickness CT4 of the fourth lens on the optical axis satisfy 0.7≤CT1/(CT2+CT3+CT4)<1.1.

7. The optical imaging system as claimed in claim 1, wherein the spacing distance T23 between the second lens and the third lens on the optical axis and the center thickness CT3 of the third lens on the optical axis satisfy 0.1≤T23/CT3<0.8.

8. The optical imaging system as claimed in claim 1, wherein a combined focal length f34 of the third lens and the fourth lens and a combined focal length f56 of the fifth lens and the sixth lens satisfy −5<f34/f56<1.

9. The optical imaging system as claimed in claim 1, wherein ΣCT is a sum of a center thicknesses of the first lens to the seventh lens on the optical axis, TTL is a distance from an object-side surface of the first lens to an imaging surface of the optical imaging system on the optical axis, ΣCT and TTL satisfy 0.5≤ΣCT/TTL≤0.7.

10. An optical imaging system, sequentially comprising from an object side to an image side along an optical axis: a first lens, a second lens, a third lens, a fourth lens, a fifth lens, a sixth lens, and a seventh lens,
    wherein,
    the first lens has a positive refractive power;
    the second lens has a negative refractive power, a paraxial region of an object-side surface thereof is a concave surface, and a paraxial region of an image-side surface thereof is a convex surface;
    the third lens has a refractive power;
    the fourth lens has a positive refractive power, a paraxial region of an object-side surface thereof is a concave surface, and a paraxial region of an image-side surface thereof is a convex surface;

the fifth lens has a refractive power;

the sixth lens has a refractive power;

the seventh lens has a negative refractive power, and a paraxial region of an object-side surface thereof is a convex surface; and a total effective focal length f of the optical imaging system and an effective focal length f7 of the seventh lens satisfy −1<f/f7<0;

the total effective focal length f of the optical imaging system and a maximum angle of half field of view HFOV of the optical imaging system satisfy 3.9 mm<f*TAN(HFOV)<4.5 mm.

11. The optical imaging system as claimed in claim 10, where ΣCT is a sum of a center thicknesses of the first lens to the seventh lens on the optical axis, TTL is a distance from an object-side surface of the first lens to an imaging surface of the optical imaging system on the optical axis, ΣCT and TTL satisfy 0.5≤ΣCT/TTL≤0.7.

12. The optical imaging system as claimed in claim 11, wherein a spacing distance T23 between the second lens and the third lens on the optical axis and a center thickness CT3 of the third lens on the optical axis satisfy 0.1≤T23/CT3<0.8.

13. The optical imaging system as claimed in claim 11, wherein a center thickness CT1 of the first lens on the optical axis, a center thickness CT2 of the second lens on the optical axis, a center thickness CT3 of the third lens on the optical axis, and a center thickness CT4 of the fourth lens on the optical axis satisfy 0.7≤CT1/(CT2+CT3+CT4)<1.1.

14. The optical imaging system as claimed in claim 10, wherein a curvature radius R2 of an image-side surface of the first lens and a curvature radius R1 of an object-side surface of the first lens satisfy 1<R2/(R1*2)≤2.5.

15. The optical imaging system as claimed in claim 14, wherein the total effective focal length f of the optical imaging system and an effective focal length f1 of the first lens satisfy 1≤f/f1<1.5.

16. The optical imaging system as claimed in claim 10, wherein a curvature radius R13 of an object-side surface of the seventh lens, a curvature radius R14 of an image-side surface of the seventh lens, a curvature radius R11 of an object-side surface of the sixth lens, and a curvature radius R12 of an image-side surface of the sixth lens satisfy 0.3<(R13+R14)/(R11+R12)<1.

17. The optical imaging system as claimed in claim 10, wherein a combined focal length f34 of the third lens and the fourth lens and a combined focal length f56 of the fifth lens and the sixth lens satisfy −5<f34/f56<1.

18. The optical imaging system as claimed in claim 17, wherein the total effective focal length f of the optical imaging system and an entrance pupil diameter EPD of the optical imaging system satisfy f/EPD≤1.8.

* * * * *